United States Patent
Sheppard et al.

(10) Patent No.: US 11,561,942 B1
(45) Date of Patent: Jan. 24, 2023

(54) METHODS AND APPARATUS TO ESTIMATE AUDIENCE SIZES OF MEDIA USING DEDUPLICATION BASED ON VECTOR OF COUNTS SKETCH DATA

(71) Applicant: The Nielsen Company (US), LLC, New York, NY (US)

(72) Inventors: Michael Sheppard, Holland, MI (US); Jonathan L. Sullivan, Hurricane, UT (US); Jake Ryan Dailey, San Francisco, CA (US); Damien Forthomme, Seattle, WA (US); Jessica D. Brinson, Chicago, IL (US); Molly Poppie, Arlington Heights, IL (US); Christie Nicole Summers, Baltimore, MD (US); Diane Morovati Lopez, West Hills, CA (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 90 days.

(21) Appl. No.: 16/919,974

(22) Filed: Jul. 2, 2020

Related U.S. Application Data

(60) Provisional application No. 62/871,017, filed on Jul. 5, 2019.

(51) Int. Cl.
*G06F 16/215* (2019.01)
*H04N 21/442* (2011.01)
(Continued)

(52) U.S. Cl.
CPC ...... *G06F 16/215* (2019.01); *G06F 16/24556* (2019.01); *H04L 67/535* (2022.05); *H04N 21/44222* (2013.01)

(58) Field of Classification Search
None
See application file for complete search history.

(56) References Cited

U.S. PATENT DOCUMENTS 6,108,637 A   8/2000   Blumenau
6,349,296 B1  2/2002   Broder et al.
(Continued)

FOREIGN PATENT DOCUMENTS

WO   WO-2016086905 A1 *  6/2016

OTHER PUBLICATIONS

United States Patent and Trademark Office, "Notice of Allowance and Fee(s) Due", issued in connection with U.S. Appl. No. 16/919,973, dated Mar. 16, 2022, 10 pages.
(Continued)

*Primary Examiner* — Augustine K. Obisesan
(74) *Attorney, Agent, or Firm* — Hanley, Flight & Zimmerman, LLC

(57) ABSTRACT

Methods and apparatus to estimate audience sizes using deduplication based on vector of counts sketch data are disclosed. An example apparatus to determine an audience size for media based on vector of counts sketch data includes: a coefficient analyzer to determine coefficient values of a polynomial based on variances, a covariance, and cardinalities corresponding to a first vector of counts from a first database and a second vector of counts from a second database; an overlap analyzer to determine a real root of the polynomial, the real root corresponding to an estimate of an overlap between the first vector of counts and the second vector of counts; and a report generator to estimate the audience size based on the estimate of the overlap and the cardinalities of the first vector of counts and the second vector of counts.

33 Claims, 7 Drawing Sheets

(51) Int. Cl.
*G06F 16/2455* (2019.01)
*H04L 67/50* (2022.01)

(56) References Cited

U.S. PATENT DOCUMENTS

| | | | |
|---|---|---|---|
| 8,165,414 B1 | 4/2012 | Yagnik | |
| 8,234,151 B1 * | 7/2012 | Pickton | G06Q 30/0205 |
| | | | 705/7.31 |
| 8,370,489 B2 | 2/2013 | Mazumdar et al. | |
| 8,453,173 B1 | 5/2013 | Anderson et al. | |
| 8,930,701 B2 | 1/2015 | Burbank et al. | |
| 8,984,547 B2 | 3/2015 | Lambert et al. | |
| 9,117,227 B1 * | 8/2015 | Agrawal | G06Q 30/0275 |
| 9,237,138 B2 | 1/2016 | Bosworth et al. | |
| 9,575,681 B1 | 2/2017 | Fisher et al. | |
| 9,785,666 B2 | 10/2017 | Li et al. | |
| 10,248,811 B2 | 4/2019 | Sullivan et al. | |
| 11,416,461 B1 | 8/2022 | Sheppard et al. | |
| 2002/0056087 A1 * | 5/2002 | Berezowski | H04N 21/6175 |
| | | | 348/E7.071 |
| 2007/0136225 A1 | 6/2007 | Church et al. | |
| 2008/0016016 A1 | 1/2008 | Mitarai et al. | |
| 2010/0205430 A1 | 8/2010 | Chiou et al. | |
| 2010/0242061 A1 * | 9/2010 | Levitan | H04H 60/31 |
| | | | 725/19 |
| 2012/0072469 A1 | 3/2012 | Perez et al. | |
| 2013/0262181 A1 * | 10/2013 | Topchy | H04H 60/31 |
| | | | 705/7.31 |
| 2014/0075018 A1 | 3/2014 | Maycotte et al. | |
| 2015/0193813 A1 * | 7/2015 | Toupet | G06Q 50/01 |
| | | | 705/14.41 |
| 2015/0248615 A1 * | 9/2015 | Parra | A61B 5/377 |
| | | | 706/46 |
| 2016/0034201 A1 | 2/2016 | Chambliss et al. | |
| 2016/0086208 A1 | 3/2016 | Oliver et al. | |
| 2016/0134934 A1 * | 5/2016 | Jared | G06Q 30/0203 |
| | | | 725/14 |
| 2016/0189181 A1 * | 6/2016 | McClave | G06Q 50/01 |
| | | | 705/7.33 |
| 2016/0224866 A1 | 8/2016 | Imade | |
| 2016/0323616 A1 | 11/2016 | Doe | |
| 2016/0379235 A1 | 12/2016 | Mendrisova et al. | |
| 2016/0379246 A1 * | 12/2016 | Sheppard | G06Q 30/0246 |
| | | | 705/14.45 |
| 2016/0381109 A1 | 12/2016 | Barnett et al. | |
| 2017/0004526 A1 | 1/2017 | Morovati et al. | |
| 2017/0011420 A1 | 1/2017 | Sullivan et al. | |
| 2017/0053306 A1 | 2/2017 | Sissenich et al. | |
| 2017/0083580 A1 | 3/2017 | Sheppard et al. | |
| 2017/0155956 A1 | 6/2017 | Nagaraja Rao et al. | |
| 2017/0257596 A1 | 9/2017 | Murata et al. | |
| 2018/0176622 A1 | 6/2018 | Sheppard et al. | |
| 2018/0332177 A1 | 11/2018 | Shah et al. | |
| 2019/0114343 A1 | 4/2019 | Guo et al. | |
| 2019/0147461 A1 | 5/2019 | Sheppard et al. | |
| 2019/0220873 A1 | 7/2019 | Sullivan et al. | |
| 2021/0004864 A1 | 1/2021 | Daub et al. | |
| 2021/0406232 A1 | 12/2021 | Sheppard et al. | |

OTHER PUBLICATIONS

United States Patent and Trademark Office, "Corrected Notice of Allowance", issued in connection with U.S. Appl. No. 16/919,973, dated Mar. 25, 2022, 2 pages.

United States Patent and Trademark Office, "Non-Final Office Action", issued in connection with U.S. Appl. No. 16/917,459, dated Apr. 26, 2022, 21 pages.

United States Patent and Trademark Office, "Final Office Action," dated Sep. 30, 2022 in connection with U.S. Appl. No. 16/917,459, 13 pages.

Coffey et al., "Internet Audience Measurement A Practitioner's View," Journal of Interactive Advertising, vol. 1, No. 2, pp. 10-17, 2001, 8 pages.

Bhatt et al., "Can Combining Demographics and Biometrics Improve De-duplication Performance," IEEE Conference on Computer Vision and Pattern Recognition Workshops (CVPRW), 2013, 6 pages.

Metzger et al., "Public Opinion and Policy Initiatives for Online Privacy Protection," Journal of Broadcasting & Electronic Media, Sep. 2003, 25 pages.

Ma et al., "Compute N-Way De-Duplicated Reach Using Privacy Safe Vector of Counts," Technical Disclosure Commons, Apr. 15, 2020, (14 pages).

United States Patent and Trademark Office, "Non Final Office Action" issued in connection with U.S. Appl. No. 16/919,973, dated Sep. 17, 2021, 16 pages.

Peng et al. "Privacy-centric Cross-publisher Reach and Frequency Estimation Via Vector of Counts," Dec. 2020. 38 pages.

* cited by examiner

METHODS AND APPARATUS TO ESTIMATE AUDIENCE SIZES OF MEDIA USING DEDUPLICATION BASED ON VECTOR OF COUNTS SKETCH DATA

RELATED APPLICATION

This patent arises from a non-provisional application that claims the benefit of U.S. Provisional Patent Application Ser. No. 62/871,017, which was filed on Jul. 5, 2019. U.S. Provisional Patent Application Ser. No. 62/871,017 is hereby incorporated herein by reference in its entirety. Priority to U.S. Provisional Patent Application Ser. No. 62/871,017 is hereby claimed.

FIELD OF THE DISCLOSURE

This disclosure relates generally to monitoring audiences and, more particularly, to methods and apparatus to estimate audience sizes using deduplication based on vector of counts sketch data.

BACKGROUND

Traditionally, audience measurement entities determine audience exposure to media based on registered panel members. That is, an audience measurement entity (AME) enrolls people who consent to being monitored into a panel. The AME then monitors those panel members to determine media (e.g., television programs or radio programs, movies, DVDs, advertisements, webpages, streaming media, etc.) exposed to those panel members. In this manner, the AME can determine exposure metrics for different media based on the collected media measurement data.

As people are accessing more and more media through digital means (e.g., via the Internet), it is possible for online publishers and/or database proprietors providing such media to track all instances of exposure to media (e.g., on a census wide level) rather than being limited to exposure metrics based on audience members enrolled panel members of an AME. However, database proprietors are typically only able to track media exposure pertaining to online activity associated with the platforms operated by the database proprietors. Where media is delivered via multiple different platforms of multiple different database proprietors, no single database proprietor will be able to provide exposure metrics across the entire population to which the media was made accessible.

Figure 1:
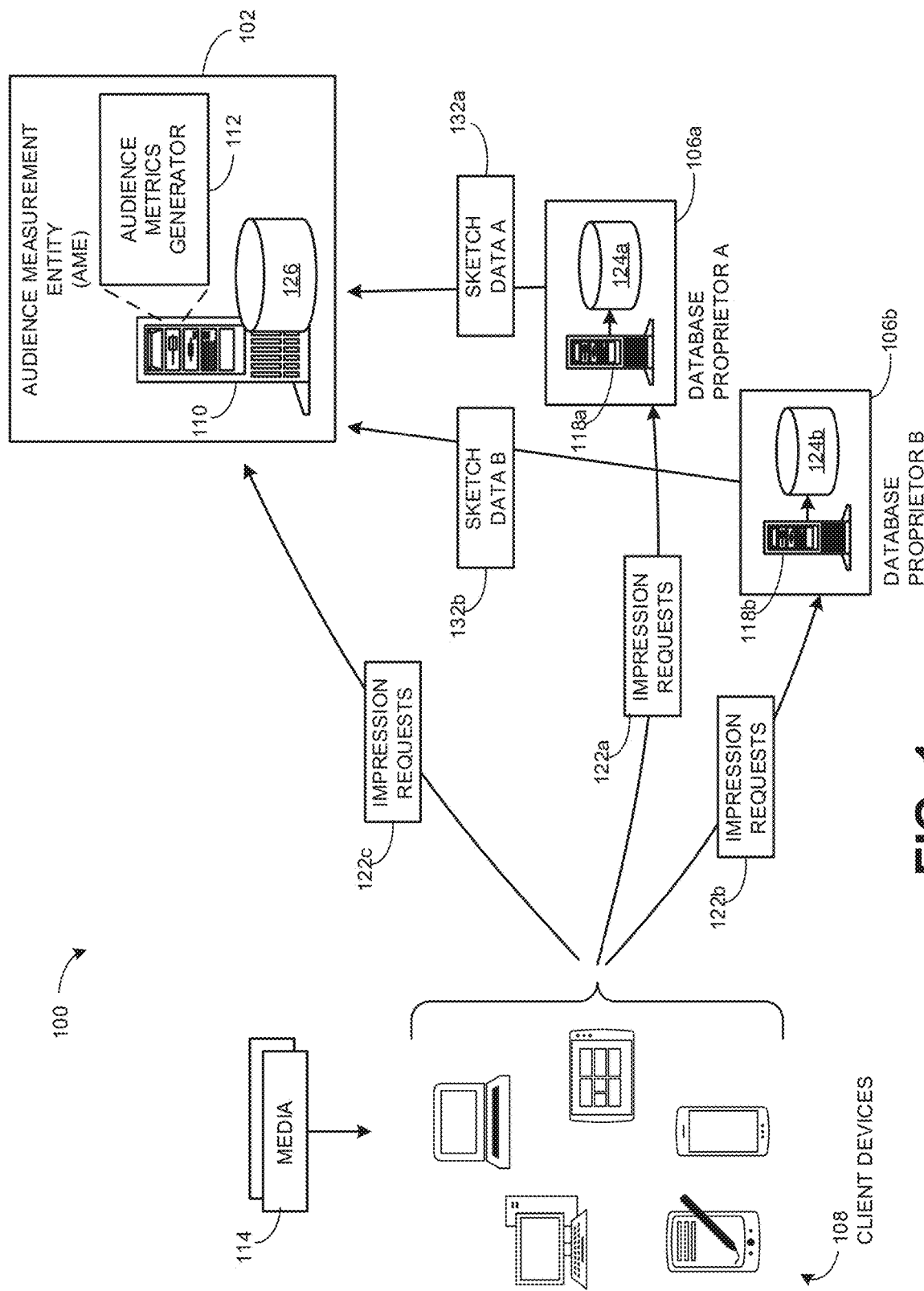
FIG. 1 is an example environment to implement a technique for logging impressions of accesses to server-based media.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Techniques for monitoring user access to an Internet-accessible media, such as digital television (DTV) media and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client. The monitoring instructions are, thus, executed whenever the media is accessed, be it from a server or from a cache. Upon execution, the monitoring instructions cause the client to send or transmit monitoring information from the client to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, My Space, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when they visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although an AME (e.g., a third party) might find it advantageous to access the cookies set by the database proprietors, they are unable to do so.

The inventions disclosed in Mainak et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mainak accomplish this task by structuring the AME to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client to thereby identify the client based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporality available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a tag (e.g., census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is necessary to adjust cross-platform media exposure totals by reducing (e.g., eliminating) the double counting of individual audience members that were exposed to media via more than one platform and/or are represented in more than one database of media impressions used to determine the reach of the media.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

An AME may want to find unique audience/deduplicate impressions across multiple database proprietors, custom date ranges, custom combinations of assets and platforms, etc. Some deduplication techniques perform deduplication across database proprietors using particular systems (e.g., Nielsen's TV Panel Audience Link). For example, such deduplication techniques match or probabilistically link personally identifiable information (PII) from each source. Such deduplication techniques require storing massive amounts of user data or calculating audience overlap for all possible combinations, neither of which are desirable. PII data can be used to represent and/or access audience demographics (e.g., geographic locations, ages, genders, etc.).

In some situations, while the database proprietors may be interested in collaborating with an AME, the database proprietor may not want to share the PII data associated with its subscribers to maintain the privacy of the subscribers. One solution to the concerns for privacy is to share sketch data that provides summary information about an underlying dataset without revealing PII data for individuals that may be included in the dataset. Such sketch data may include a cardinality defining the number of individuals represented by the data (e.g., subscribers) while maintaining the identity of such individuals private. The cardinality of sketch data associated with media exposure is a useful piece of information for an AME because it provides an indication of the number of audience members exposed to particular media via a platform maintained by the database proprietor providing the sketch data. However, problems for audience metrics arise when the media may be accessed via multiple different database proprietors that each provide separate sketch data summarizing the individual subscribers that were exposed to the media. In particular, the sum of the cardinalities of each sketch data is not a reliable estimate of the unique audience size because the same individual may be represented in multiple datasets associated with different sketch data. As a result, such individuals will be double counted resulting in the incorrection inflation of the unique audience size. Furthermore, identifying overlap between two different sets of sketch data is non-trivial because, as stated above, the sketch data is generated to preserve the identity and privacy of the individuals represented thereby. Examples disclosed herein overcome the above challenges by enabling the estimation of overlap between sketch data provided by two different datasets so that an AME may be able to deduplicate individuals represented across both datasets, thereby enabling the accurate estimate of the unique audience for a particular media item.

Notably, although third-party cookies are useful for third-party measurement entities in many of the above-described techniques to track media accesses and to leverage demographic information from third-party database proprietors, use of third-party cookies may be limited or may cease in some or all online markets. That is, use of third-party cookies enables sharing anonymous PII subscriber information across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop supporting third-party cookies. This will make it more challenging for third-party measurement entities to track media accesses via first-party servers. That is, although first-party cookies will still be supported and useful for media providers to track accesses to media via their own first-party servers, neutral third parties interested in generating neutral, unbiased audience metrics data will not have access to the impression data collected by the first-party servers using first-party cookies. Examples disclosed herein may be implemented with or without the availability of third-party cookies because, as mentioned above, the datasets used in the deduplication process are generated and provided by database proprietors, which may employ first-party cookies to track media impressions from which the datasets (e.g., sketch data) is generated.

Although examples disclosed herein are described in association with audience metrics related to media impressions, examples disclosed herein may be similarly used for other applications to deduplicate between any two datasets while preserving privacy. The datasets themselves need not be audiences or email addresses. They could be, for example, bank accounts, lists of purchased items, store visits, traffic patterns, etc. The datasets could be represented as lists of numbers or any other information.

FIG. 1 shows an example environment 100 that includes an example audience measurement entity (AME) 102, an example database proprietor A 106a, an example database proprietor B 106b, and example client devices 108. The example AME 102 includes an example AME computer 110 that implements an example audience metrics generator 112 to determine audience sizes based on media impressions logged by the database proprietors 106a-b. In the illustrated example of FIG. 1, the AME computer 110 may also implement an impression monitor system to log media impressions reported by the client devices 108. In the illustrated example of FIG. 1, the client devices 108 may be stationary or portable computers, handheld computing devices, smart phones, Internet appliances, smart televisions, and/or any other type of device that may be connected to the Internet and capable of accessing and/or presenting media.

As used herein, an audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once in the audience size for that media item. Audience size may also be referred to as unique audience or deduplicated audience.

As used herein, a media impression is defined as an occurrence of access and/or exposure to media 114 (e.g., an advertisement, a movie, a movie trailer, a song, a web page banner, etc.). Examples disclosed herein may be used to monitor for media impressions of any one or more media types (e.g., video, audio, a web page, an image, text, etc.). In examples disclosed herein, the media 114 may be content and/or advertisements. Examples disclosed herein are not restricted for use with any particular type of media. On the contrary, examples disclosed herein may be implemented in connection with tracking impressions for media of any type or form in a network.

In the illustrated example of FIG. 1, content providers and/or advertisers distribute the media 114 via the Internet to users that access websites and/or online television services (e.g., web-based TV, Internet protocol TV (IPTV), etc.). In some examples, the media 114 is served by media servers of the same internet domains as the database proprietors 106a-b. For example, the database proprietors 106a-b include corresponding database proprietor servers 118a-b that can serve media 114 to their corresponding subscribers via the client devices 108. Examples disclosed herein can be used to generate audience metrics data that measures audience sizes of media served by different ones of the database proprietors 106a-b. For example, the database proprietors 106a-b may use such audience metrics data to promote their online media serving services (e.g., ad server services, media server services, etc.) to prospective clients. By showing audience metrics data indicative of audience sizes drawn by corresponding ones of the database proprietors 106a-b, the database proprietors 106a-b can sell their media serving services to customers interested in delivering online media to users.

In some examples, the media 114 is presented via the client devices 108. When the media 114 is accessed by the client devices 108, the client devices 108 send impression requests 122a-b to the database proprietor servers 118a-b to inform the database proprietor servers 118a-b of the media accesses. In this manner, the database proprietor servers 118a-b can log media impressions in impression records of corresponding database proprietor audience metrics databases 124a-b. When a database proprietor 118a-b serves the media 114, the impression request 122a-b includes a first-party cookie set by that database proprietor 118a-b so that the database proprietor 118a-b can log an impression for the media 114 without using a third-party cookie. In some examples, the client devices 108 also send impression requests 122c to the AME 102 so that the AME 102 can log census impressions in an AME audience metrics database 126. In the illustrated example of FIG. 1, the database proprietors 106a-b log demographic impressions corresponding to accesses by the client devices 108 to the media 114. Demographic impressions are impressions logged in association with demographic information collected by the database proprietors 106a-b from registered subscribers of their services. Also, in the illustrated example of FIG. 1, the AME computer 110 logs census-level media impressions corresponding to accesses by client devices 108 to media 114. Census-level media impressions (e.g., census impressions) are impressions logged regardless of whether demographic information is known for those logged impressions. In some examples, the census impressions include some media impressions accessed via a platform maintained by the database proprietor A 106a and some media impressions accessed via a platform maintained by the database proprietor B 106b. In some examples, the AME computer 110 does not collect impressions, and examples disclosed herein are based on audience data from impressions collected by the database proprietors 106a-b.

In some examples, the media 114 is encoded to include a media identifier (ID). The media ID may be any identifier or information that can be used to identify the corresponding media 114. In some examples the media ID is an alphanumeric string or value. In some examples, the media ID is a collection of information. For example, if the media 114 is an episode, the media ID may include program name, season number, and/or episode number. When the example media 114 includes advertisements, such advertisements may be content and/or advertisements. The advertisements may be individual, standalone ads and/or may be part of one or more ad campaigns. In some examples, the ads of the illustrated example are encoded with identification codes (e.g., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of content monitoring (e.g., web pages, movies, television programs, etc.).

In some examples, the media 114 of the illustrated example is tagged or encoded to include monitoring or tag instructions, which are computer executable monitoring instructions (e.g., Java, java script, or any other computer language or script) that are executed by web browsers that access the media 114 via, for example, the Internet. Execution of the monitoring instructions causes the web browser to send the impression requests 122a-c (e.g., also referred to as tag requests) to one or more specified servers of the AME 102, the database proprietor A 106a, and/or the database proprietor B 106b. As used herein, tag requests 122a-c are used by the client devices 108 to report occurrences of media impressions caused by the client devices accessing the media 114. In the illustrated example, the tag requests 122a-b include user-identifying information that the database proprietors 106a-b can use to identify the subscriber that accessed the media 114. For example, when a subscriber of the database proprietor A 106a logs into a server of the database proprietor A 106a via a client device 108, the database proprietor A 106a sets a database proprietor cookie on the client device 108 and maps that cookie to the subscriber's identity/account information at the database proprietor server 118*a*. In examples disclosed herein, subscriber identity and/or subscriber account information includes personally identifiable information (PII) such as full name, street address, residence city and state, telephone numbers, email addresses, ages, dates of birth, social security numbers, demographic information, and/or any other person information provided by subscribers in exchange for services from the database proprietors 106*a-b*. By having such PII data mapped to database proprietor cookies, the database proprietor A 106*a* can subsequently identify the subscriber based on the database proprietor cookie to determine when that user accessed different media 114 and to log an impression in association with demographics and/or other PII data of that user. In the illustrated example of FIG. 1, the impression requests 122*a-b* include database proprietor cookies of the client devices 108 to inform the database proprietors 106*a-b* of the particular subscribers that accessed the media 114. In some examples, the AME 102 also sets AME cookies in the client devices 108 to identify users that are enrolled in a panel of the AME 102 such that the AME 102 collects PII data of people that agree to having their internet activities monitored by the AME 102.

The tag requests 122*a-c* may be implemented using HTTP requests. However, whereas HTTP requests are network communications that traditionally identify web pages or other resources to be downloaded, the tag requests 122*a-c* of the illustrated example are network communications that include audience measurement information (e.g., ad campaign identification, content identifier, and/or user identification information) as their payloads. The server (e.g., the AME computer 110 and/or the database proprietor servers 118*a-b*) to which the tag requests 122*a-c* are directed is programmed to log occurrences of impressions reported by the tag requests 122*a-c*. Further examples of monitoring instructions (e.g., beacon instructions) and uses thereof to collect impression data are disclosed in Mazumdar et al., U.S. Pat. No. 8,370,489, entitled "Methods and Apparatus to Determine Impressions using Distributed Demographic Information," which is hereby incorporated herein by reference in its entirety.

In other examples in which the media 114 is accessed by apps on mobile devices, tablets, computers, etc. (e.g., that do not employ cookies and/or do not execute instructions in a web browser environment), an app publisher (e.g., an app store) can provide a data collector in an install package of an app for installation at the client devices 108. When a client device 108 downloads the app and consents to the accompanying data collector being installed at the client device 108 for purposes of audience/media/data analytics, the data collector can detect when the media 114 is accessed at the client device 108 and cause the client device 108 to send one or more of the impression requests 122*a-c* to report the access to the media 114. In such examples, the data collector can obtain user identifiers and/or device identifiers stored in the client devices 108 and send them in the impression requests 122*a-c* to enable the database proprietors 106*a-b* and/or the AME 102 to log impressions. Further examples of using a collector in client devices to collect impression data are disclosed in Burbank et al., U.S. Pat. No. 8,930,701, entitled "Methods and Apparatus to Collect Distributed User Information for Media Impressions and Search Terms," and in Bosworth et al., U.S. Pat. No. 9,237,138, entitled "Methods and Apparatus to Collect Distributed User Information for Media Impressions and Search Terms," both of which are hereby incorporated herein by reference in their entireties.

In some examples, the database proprietor servers 118*a-b* may additionally or alternatively user server logs to log impressions based on requests for media 114 from the client devices 108. For example, when a user of a client device 108 provides a URL or selects an item of media for viewing, the client device 108 sends an HTTP request (e.g., the impression request 122*a-b*) to a database proprietor server 118, a-b that includes the first-party cookie and an identifier of the requested media. In response, the database proprietor server 118*a*0*b* serves the requested media to the client device 108 and logs an impression of the media as attributable to the client device 108.

In the illustrated example, the database proprietors 106*a-b* would like to collaborate with the AME 102 so that the AME 102 can operate as an independent party that measures and/or verifies audience measurement information pertaining to the media 114 accessed by the subscribers of the database proprietors 106*a-b*. However, the database proprietors 106*a-b* desire to do so while protecting the privacies of their subscribers by not sharing or revealing subscriber identities, subscriber information, and/or any other subscriber PII data to outside parties. In examples disclosed herein, to share impression data with the AME 102 without revealing subscriber identities, subscriber information, and/or any other subscriber PII data, the database proprietors 106*a-b* process their collected impression data to generate corresponding sketch data 132*a-b*.

As used herein, sketch data is an arrangement of data for use in massive data analyses. For example, operations and/or queries that are specified with respect to the explicit and/or very large subsets, can be processed instead in sketch space (e.g., quickly (but approximately) from the much smaller sketches representing the actual data). This enables processing each observed item of data (e.g., each logged media impression and/or audience member) quickly in order to create a summary of the current state of the actual data. In some examples, the sketch data 132*a-b* corresponds to a vector of values generated by processing data entries in the database through one or more hash functions. More particularly, in some examples, the PII associated with particular audience members are used as inputs for the hash function(s) to generate outputs corresponding to the values of the vector for the sketch data. Inasmuch as hashing functions cannot be reversed, the PII data for the particular audience members is kept private, thereby preserving the anonymity of the underlying raw data represented by the sketch data 132*a-b*. While it would be possible to generate a vector for sketch data of all subscribers of either one of the database proprietors 106*a-b*, in many instances, the subscribers included in particular sketch data may be the subset of all subscribers that corresponds to audience members that accessed and/or were exposed to a particular media item 114 of interest.

In some examples, the database proprietors 106*a-b* agree on a method of hashing and summarizing their respective data. For example, the agreed upon type of hashing and summary type may involve the use of binomial hash on different entries in a database to generate sketch data based on a vector of counts. As used herein, a binomial hash (also referred to herein as a bit hash) is a hash function that generates a vector or array of multiple binary outputs (e.g., a string of 0s and/or 1s) from any input (e.g., an audience member's email address) with each element in the array being equally likely (e.g., there is a 50% chance that any given bit in the array will be a 0 and a 50% chance that the bit will be a 1). In some examples, the hash may generate an output that is not in binary form but may be converted to binary form with just 0s and 1s. For example, the hash may generate the hexadecimal output of D447, which would convert to the binary array of 1101010001000111. Further, the hash is defined such that any combination of array values generated by the hash function (e.g., any combination of 0s and 1s or other digits and/or letters for non-binary outputs) is equally likely as any other combination of array values. Further still, the hash is defined such that the same output will always result from the same input. As such, if both database proprietors 106a-b use the same hash function on the same PII (e.g., "johnsmith@email.com"), both database proprietors 106a-b will output the same array of values.

In some examples, to generate the final vector of counts sketch data, the output of the hash function applied to each entry in the database is used to generate an integer value from 1 to n, where n is the number of elements in the vector of counts. The transformation of the output of the hash function to the integer value may be accomplished in any manner that results in a distribution that is uniform (e.g., there is a 1/n probability for any given integer value resulting from the transformation) and consistent (e.g., the same output of the hash function always produces the same integer value). The integer value derived from the output of the hash function applied to a particular data entry is used to identify the particular element within the vector of counts that is to be incremented by 1 to represent the particular data entry. For example, if a first entry in a database (e.g., "johnsmith@email.com") is hashed to the binary array of 11010100, and the total number of elements in the vector of counts is n=16, then only four bits are needed to define any integer value from 1 to 16. Accordingly, in some examples, the four leading bits of 1101 are selected to define a base ten number corresponding to the integer value. That is, the binary value of 1101 corresponds to the decimal number 13 such that the 13$^{th}$ element (out of 16) in the vector of counts is incremented by 1. As subsequent entries in the database are hashed and transformed to an integer value, the corresponding element in the vector of counts is incremented such that each element in the final vector will represent a count of the total number of entries designated to each element in the vector. As a result, the summation of values across all elements in the vector of counts will correspond to the cardinality of the sketch data (e.g., the total number of unique entries in the database represented by the vector of counts). In some examples, multiple different hash functions may be applied to each entry and assigned to a particular element within the vector of counts based on the process outlined above. In such examples, the summation of values across all elements in the vector of counts will corresponding to the cardinality of the sketch data multiplied by the number of hash functions used. For purposes of explanation, examples described below assume only one hash function is used.

As a more specific example, assume that the sketch data A 132a represents 1000 different subscribers and that the sketch data B 132b represents 2000 different subscribers where both sketch data 132a-b is a vector of counts of length 10. If the hash function used for all 1000 subscribers in the sketch data A 132a generates outputs for 90 of the subscribers that transform to an integer value of 1, the first element in the vector of counts sketch data A 132a would be 90. The remaining nine elements in the vector of counts would be assigned values corresponding to the total number of outputs of the hash functions used across the remaining 910 subscribers that was transformed to each of the integer values 2 through 16. The values in the vector of counts for the sketch data B 132b generated by the database proprietor B 106b is likely to be different than for the sketch data A 132a because the database proprietor B 106b has different subscribers than the database proprietor A 106a potentially resulting in different outputs for the hash functions that are designated to different elements in the vector of counts. Furthermore, the values in the vectors for the sketch data 132a-b are likely to differ because a different total number of subscribers are included in the sketch data (e.g., 1000 subscribers for the sketch data A 132a and 2000 subscribers for the sketch data B 132b).

Once the database proprietors 106a-b have generated the vector of counts for the sketch data 132a-b, the database proprietors 106a-b may provide the sketch data 132a-b to the AME computer 110 for use in estimating audience sizes of media items 114 accessed via the Internet on the client devices 108 by user subscribers of the database proprietors 106a-b that are reported in the sketch data 132a-b. In some examples, the database proprietors 106a-b may modify the vector for the sketch data 132a-b before delivering the same to the AME 102. For instance, in some examples, the database proprietors 106a-b may elect to insert noise into the vector for the sketch data 132a-b to produce data with a secondary level of privacy protection for the PII data of the subscribers. However, in some examples, the database proprietors 106a-b may elect not to insert noise.

In some examples, in addition to the vector of counts, the sketch data 132a-b may also include an indication of the cardinality associated with the vector. That is, in some examples, the database proprietors 106a-b report the total number of subscribers represented by the sketch data 132a-b (e.g., 1000 subscribers for sketch data A 132a and 2000 subscribers for sketch data B 132b in the above example). The cardinality may not be necessary when no noise is included in the sketch data 132a-b because, as indicated above, the cardinality corresponds to the sum of values across all elements in the vector of counts. However, when noise is included, the sum of values may not correspond to the actual cardinality of the underlying data such that the cardinality may be separately provided. The total number of subscribers represented across both sketch data 132a-b (e.g., the cardinalities of the sketch data) is not an indication of the audience size of an associated media item 114 because one or more of the subscribers represented in the sketch data A 132a may also be represented in the sketch data B 132b. Examples disclosed herein enable the deduplication of audience members across both datasets to estimate the true unique audience for the particular media of interest.

More particular, the unique audience (UA) for media represented across sketch data 132a-b from two database proprietors 106a-b may be defined mathematically by Equation 1 as follows:

$$UA = A + B - W \qquad \text{Eq. 1}$$

where A is the known (e.g., provided) cardinality for sketch data A 132a, B is the known (e.g., provided) cardinality for sketch data B 132b, and W is the number of unique entries represented in both sketch data A 132a and sketch data B 132b.

The number of unique entries (W) that overlap in both sketch data A 132a and sketch data B 132b (e.g., the number of duplicate audience members across the combination of sketch data from both database proprietors 106a-b) is the only unknown in Equation 1 needed to solve for the unique audience (UA). While W cannot be directly determined from the available information, W can be estimated based on the covariance of the vectors of the sketch data 132a-b (e.g., a measure of variability in corresponding values in the two vectors) as outlined in Equation 2:

$$\hat{W} = \frac{1}{c}\text{cov}(V_A, V_B) \qquad \text{Eq. 2}$$

where $\hat{W}$ is the estimate for W, $V_A$ is the vector of counts for sketch data A 132a, $V_B$ is the vector of counts for sketch data B 132b, and $c=p(1-p)$, where p is the probability of a particular entry being assigned to a particular element within the vector of counts. As mentioned above, the hash function and associated transformation to an integer value is defined to produce a uniform such that $p=1/n$. The expected value and the variance for the estimate W may be defined mathematically by Equations 3 and 4.

$$E[\hat{W}] = W \qquad \text{Eq. 3}$$

$$\text{Var}[\hat{W}] = \frac{AB + W^2}{n} \qquad \text{Eq. 4}$$

where n is the length of the vectors $V_A$ and $V_B$. As can be seen from Equation 3, the estimate $\hat{W}$ for W is unbiased. Further, as demonstrated by Equation 4, the variance decreases as the length of the vectors (n) increases. Thus, as the number of paired values (from each of the two vectors) increases, the estimate improves with a smaller variance. The actual number of duplicate or overlapping entries between the sketch data 132a-b from both database proprietors 106a-b may range between two extremes including (1) complete overlap when the entries (e.g., audience members) in both datasets are the same (e.g., A=B=W), and (2) no overlap when the two datasets are disjoint with no common entries (e.g., W=0). The variance of the estimate $\hat{W}$ for both extremes may be simplified from Equation 4 as follows:

$$\text{Complete Overlap: Var}[\hat{W}] = \frac{2W^2}{n} \qquad \text{Eq. 5}$$

$$\text{Disjoint: Var}[\hat{W}] = \frac{AB}{n} \qquad \text{Eq. 6}$$

For purposes of illustration, assume the following values for A, B, and W:

$$A = 1000 \qquad \text{Eq. 7}$$

$$B = 2000 \qquad \text{Eq. 8}$$

$$W = 500 \qquad \text{Eq. 9}$$

Further, assume that the two database proprietors 106a-b do the same hash functions across their respective datasets and use the same transformation process to arrive an integer value between 1 and n for assigning individual entries to particular elements within the corresponding vector of counts. Finally, assume that the length of the vector of counts is n=10 and that the number of entries assigned to each element in the vectors is as follows:

$$V_A = \{90, 109, 117, 110, 115, 91, 80, 98, 92, 98\} \qquad \text{Eq. 10}$$

$$V_B = \{191, 220, 209, 206, 189, 183, 200, 197, 196, 209\} \qquad \text{Eq. 11}$$

In this example, the Unique Audience would be 2,500 as defined by Equation 1. However, this value cannot be directly determined because the actual value for W is not known. Using Equation 2, the estimate $\hat{W}$ for the above example may be calculated as 545.555, which results in an estimate for the unique audience of UA=A+B−W=1000+ 2000−545.555=2,454.44. Compared with the true value of 2,500, this estimate results in a relative error of 1.8%.

While the above estimate based on Equation 2 provides a reasonable estimate of the overlap W for a reasonable estimate of the unique audience size, examples disclosed herein improve upon the estimates possible based on Equation 2 by taking additional information into account that is available but not included in the above methodology. For example, the above approach to estimating the overlap W (referred to herein as the covariance approach) does not take into account that the cardinalities (e.g., A and B) for both sketch data A 132a and sketch data B 132a are available. Additionally, the above approach does not take into account that the values for the two vectors $V_A$ and $V_B$ (e.g., examples of which are shown Equations 10 and 11) follow a multinomial distribution with expected values of A×p and B×p, respectively. By taking this additional information into account, the systems and methods disclosed herein improve upon the overlap W calculated using Equation 2.

As outlined above, there is an equal probability (p=1/n) that any particular entry in the database of either database proprietor 106a-b will be allocated to any particular element in the corresponding vector of counts. For any particular element in the vector, this is like a Bernoulli random variable in which there is either a probability p of being allocated to the particular element in the vector or a probability of 1−p of being allocated in any other element. Stated differently, this is comparable to repeatedly flipping a biased coin, which may be represented by a binomial distribution. Further, when the number of allocations (e.g., the number of separate data entries to be allocated) is relatively large (e.g., over 100), the binomial distribution can be approximated by the normal distribution as expressed in Equation 12:

$$Bin(N,p) \sim N(Np, Np(1-p)) \qquad \text{Eq. 12}$$

where N is the cardinality of either dataset (e.g., N equals either A or B). Thus, plugging in either A or B for N and 1/n for p yields an approximation for the distribution of the vectors $V_A$ and $V_B$ for each of the sketch data A 132a and the sketch data B 132b.

The same rationale can be used for the bivariate normal taking the pair of random variables together (e.g., corresponding elements in each of $V_A$ and $V_B$), along with the correlation that the same items belonging to both datasets would produce the same hash value (and same resulting integer value for allocation to the corresponding element of the vectors). The covariance of the bivariate normal would be the same as determined above in the covariance approach described in connection with Equation 2 (e.g., $\text{cov}(V_A, V_B) = c\hat{W}$).

The bivariate normal random vector $X = (V_A, V_B)^T$ can be written as $$X \sim \mathcal{N}(\mu, \Sigma) \qquad \text{Eq. 13}$$

with $$\mu = \begin{pmatrix} \mu_x \\ \mu_y \end{pmatrix}, \Sigma = \begin{pmatrix} \sigma_X^2 & \rho\sigma_X\sigma_Y \\ \rho\sigma_X\sigma_Y & \sigma_Y^2 \end{pmatrix} \qquad \text{Eq. 14}$$

in general. For the particular problem defined with respect to A, B, and W, using the definition of $c=p(1-p)$, Equation 14 may be expressed as follows:

$$\mu = \begin{pmatrix} Ap \\ Bp \end{pmatrix}, \Sigma = \begin{pmatrix} Ac & Wc \\ Wc & Bc \end{pmatrix} \qquad \text{Eq. 15}$$

In this case, the only unknown is W (A and B are provided) such that the above equation defines a 2-dimensional, 1 parameter distribution.

In some examples, the vector of counts may be mean-centered by subtracting the mean for each vector from each element in the vector. Assuming both vectors have been mean-centered, the variance ($V_{V_A}$) of the values in the vector $V_A$ for the sketch data A 132a and the variance ($V_{V_B}$) of the vector $V_B$ for the sketch data B 132b may be expressed as follows:

$$V_{V_A} = \frac{1}{n}\sum_{i=1}^{n} V_{A-i}^2 \quad \text{Eq. 16}$$

$$V_{V_B} = \frac{1}{n}\sum_{i}^{n} V_{B-i}^2 \quad \text{Eq. 17}$$

where $V_{A-i}$ refers to the ith element in vector $V_A$, and $V_{B-i}$ refers to the ith element in vector $V_B$. Further, the covariance ($V_{V_A V_B}$) of the sketch data 132a-b from both database proprietors 106a-b may be expressed as follows:

$$V_{V_A V_B} = \frac{1}{n}\sum_{i=1}^{n} V_{A-i}V_{B-i} \quad \text{Eq. 18}$$

In some examples, with the variances and covariance of Equations 16-18 defined, the method of maximum likelihood estimation (MLE) may be used to estimate the overlap W. More particularly, the estimate of W is a root of a third-degree polynomial defined by Equation 19:

$$c_0 + c_1 W + c_2 W^2 + c_3 W^3 = 0 \quad \text{Eq. 19}$$

where the coefficients are defined by $$c_0 = -ABV_{V_A V_B} \quad \text{Eq. 20}$$

$$c_1 = AV_{V_B} + BV_{V_A} - ABc \quad \text{Eq. 21}$$

$$c_2 = -V_{V_A V_B} \quad \text{Eq. 22}$$

$$c_3 = c \quad \text{Eq. 23}$$

The expected value and the variance for the estimate $\hat{W}$ using the MLE method by solving for the real root of Equation 19 is.

$$E[\hat{W}] = W \quad \text{Eq. 24}$$

$$\text{Var}[\hat{W}] = \frac{(AB + W^2)^2}{n(AB + W^2)} \quad \text{Eq. 25}$$

As can be seen from Equations 24 and 25, the estimate $\hat{W}$ for the overlap W is unbiased and the variance decreases as the length of the vectors (n) increases. The variance of the estimate $\hat{W}$ for both extreme cases (e.g., complete overlap and no overlap) may be simplified and expressed as follows:

$$\text{Complete Overlap: Var}[\hat{W}] = 0 \quad \text{Eq. 26}$$

$$\text{Disjoint: Var}[\hat{W}] = \frac{AB}{n} \quad \text{Eq. 27}$$

As can be seen in the above equations, the variance is the worst (e.g., variance is the greatest) when the two datasets are disjoint (e.g., have no overlap) and the variance reduces to 0 (e.g., the estimate is exact) when the two dataset are the same (e.g., have complete overlap).

Notably, the variance in the estimate for the overlap W in the disjoint scenario is the same for both the MLE approach outlined above (as defined in Equation 27) and the covariance approach described further above (as defined in Equation 6). However, the variance in the estimate for W in the extreme case of complete overlap under the MLE approach outlined above (as defined in Equation 26) is different and significantly better than for the covariance approach (as defined in Equation 5). Indeed, the worst estimate for the overlap W under the MLE approach is equal to the best estimate for W under the covariance approach. In other words, the MLE approach will always provide an estimate that is at least as good as the covariance approach but will usually provide estimates that are significantly better (e.g., more accurate and/or precise) because the estimates are equal only in the extreme case of no overlap in the datasets.

As a specific example, assume the values for A, B, W, $V_A$, and $V_B$ are the same as defined above in connection with Equations 7-11. In some examples, the vector of counts may be mean-centered by subtracting the mean for each vector from each element in the vector to facilitate the processing of the data. Mean-centering the vector of counts shown in Equations 10 and 11 result in the following vectors:

$$X_A = \{-10, 9, 17, 10, 15, -9, -20, -2, -8, -2\} \quad \text{Eq. 28}$$

$$X_B = \{-9, 20, 9, 6, -11, -17, 0, -3, -4, 9\} \quad \text{Eq. 29}$$

where $X_A$ is the mean-centered vector corresponding to sketch data A 132a and $X_B$ is the mean-centered vector corresponding to sketch data B 132b. Based on these values, the variance for sketch data A ($V_{V_A}$) evaluates to 134.8 (using Equation 16), the variance for sketch data B ($V_{V_B}$) evaluates to 111.4 (using Equation 17), and the covariance of sketch data A and sketch data B ($V_{V_A V_B}$) evaluates to 49.1 (using Equation 18). From these determinations, the coefficients defined in Equations 20-23 become $c_0 = -9.82 \times 10^7$, $c_1 = 2.01 \times 10^5$, $c_2 = -49.1$, and $c_3 = 0.09$. Using these coefficients, the real root of the polynomial of Equation 19 is the improved estimate for overlap W, which is $\hat{W} = 494.175$. This estimate results in a final estimate for the unique audience of UA = A + B − W = 1000 + 2000 − 494.175 = 2,505.82. Compared with the true value of 2,500, this estimate results in a relative error of 0.2%, which is a significant improvement over the 1.8% relative error resulting from covariance approach outlined above.

As indicated in the above example, the values for the coefficients in Equations 20-23 can be relatively large and many orders of magnitude apart. Such values for the coefficients can result in numerical overflow, underflow, and/or loss of computational precision. Furthermore, these problems are likely to be exacerbated as the datasets become significantly larger, which is likely to be the case for many audience measurement applications (e.g., while the above example includes datasets of 1000 and 2000 audience members, in many instances the number of audience members may number in many thousands or even millions). Accordingly, in some examples, Equations 16-23 may be normalized by dividing the terms of the equations by the cardinality of the smaller of the two datasets to mitigate against the potential loss of numerical precision. In particular, assuming that A (e.g., the cardinality of the dataset for the sketch data A 132a) is less than or equal to B (e.g., the cardinality of the dataset for the sketch data B 132*b*), normalized variances for the vectors $V_A$ and $V_B$ and the normalized covariance of the two vectors becomes $$V'_{V_A} = \frac{V_{V_A}}{A} \qquad \text{Eq. 30}$$

$$V'_{V_B} = \frac{V_{V_B}}{A} \qquad \text{Eq. 31}$$

$$V'_{V_A V_B} = \frac{V_{V_A V_B}}{A} \qquad \text{Eq. 32}$$

The normalized third-degree polynomial becomes $$c_0' + c_1' s + c_2' s^2 + c_3' s^3 = 0 \qquad \text{Eq. 33}$$

where $s = \hat{W}/A$ and the normalized coefficients are defined by $$c_0' = -rV'_{V_A V_B} \qquad \text{Eq. 34}$$

$$c_1' = V'_{V_B} + rV'_{V_A} - cr \qquad \text{Eq. 35}$$

$$c_2' = V'_{V_A V_B} \qquad \text{Eq. 36}$$

$$c_3' = c \qquad \text{Eq. 37}$$

where $r = B/A$.

Normalizing the equations in the above manner enables the coefficients to be approximately on the same scale, thereby reducing any loss in numerical precision. In particular, with reference to the same example values for A, B, W, $V_A$, $V_B$, $X_A$, and $X_B$ outlined above at Equations 7-11, 28, and 29, the normalized variance for the sketch data A ($V'_{V_A}$) evaluates to 0.1348 (using Equation 30), the normalized variance for sketch data B ($V'_{V_B}$) evaluates to 0.1114 (using Equation 31), and the covariance of sketch data A and sketch data B ($V'_{V_A V_B}$) evaluates to 0.0491 (using Equation 32). From these determinations, the coefficients defined in Equations 34-37 become $c_0' = -0.0982$, $c_1' = 0.201$, $c_2' = -0.0491$, and $c_3' = 0.09$. As can be seen, there is significantly less variation in the size of the coefficient values once they have been normalized. Using these values along with the evaluated value of $r=2$, the real root of the polynomial of Equation 33 is the estimate for s. In the above example, s evaluates to 0.494175, from which the estimate $\hat{W}$ can be calculated by multiplying by A to arrive at $\hat{W} = s \times A = 494.175$. As can be seen, this is exactly the same estimate as in the example outlined above based on the raw (non-normalized) data, except that in this example (based on normalized data) there is less concern for any loss of numerical precision (even if the datasets are much larger).

As already mentioned above, the MLE approach to estimating overlap W disclosed herein is as good as or better than the covariance approach because the variance in estimates by the MLE approach are always less than the variance for the covariance approach except in the extreme case when there is no overlap between the datasets. The MLE approach is better than the covariance approach in most situations assuming that the amount of data used for both analyses is the same. Another way of describing the improvement of the MLE approach over the covariance approach is with respect to the length of the vectors $V_A$ and $V_B$ needed to achieve a particular level of precision (e.g., 95% confidence that the estimate is within +/-5% of the truth). A reduction in variance allows for shorter vectors (e.g., fewer elements per vector) for the sketch data 132*a-b* to be used with the MLE approach while still achieving a desired precision than would be possible than the covariance approach. This results in increased efficiencies in both processing and memory for both the database proprietors 106*a-b* generating the sketch data 132*a-b* and also for the AME 102 that processes the sketch data 132*a-b* to generate estimates for unique audience sizes.

Table 1 provides the number of elements (n) in the vector of counts needed to be 95% confident for various relative errors (e.g., 1%, 5%, 10%) in five different trials to estimate the unique audience (e.g. UA) having a true value of 1,000,000 based on equally sized datasets (e.g., A=B) with different amounts of overlap (e.g., a different W) using each of the MLE approach and the covariance approach. More particularly, the five trials represented in Table 1 include both extreme cases where there is no overlap (W=0) and where there is complete overlap (A=B=W), as well as three intermediate amounts of overlap. As can be seen with reference to Table 1, when there is no overlap (e.g., sketch data A 132*a* and sketch data B 132*b* are disjoint and W=0) the number of elements in the vector of counts (e.g., the vector length) needed to achieve the different relative errors is the same for both the covariance approach and the MLE approach. As the amount of overlap increases, the covariance approach gets worse in that a larger number of hash functions are needed to achieve the same relative error. By contrast, as the amount of overlap increases, the MLE approach improves such that fewer hash functions are needed to achieve the same relative error. In other words, the worst estimate for the MLE approach is as good as the best estimate for covariance approach. In all other situations (e.g., where there is at least some overlap in the datasets being analyzed) the MLE approach is better and can estimate the unique audience with greater precision and/or with less data (e.g., shorter vectors) for increased processing and/or memory efficiency.

TABLE 1

Number of Elements (e.g., Vector Length) needed for 95% Confidence for Different Relative Errors and Different Overlap in Datasets

| | | | Covariance Approach | | | MLE Approach | | |
|---|---|---|---|---|---|---|---|---|
| Trial | A = B | W | 10% | 5% | 1% | 10% | 5% | 1% |
| 1 | 500,000 | 0 | 96 | 384 | 9,604 | 96 | 384 | 9,604 |
| 2 | 625,000 | 250,000 | 174 | 696 | 17,407 | 91 | 365 | 9,128 |
| 3 | 750,000 | 500,000 | 312 | 1,248 | 31,212 | 46 | 185 | 4,617 |
| 4 | 875,000 | 750,000 | 510 | 2,041 | 51,019 | 12 | 48 | 1,193 |
| 5 | 1,000,000 | 1,000,000 | 768 | 3,073 | 76,829 | 1 | 1 | 1 |

The particular number of elements in the vectors needed to obtain a specific confidence level and relative error can be calculated for each of the covariance approach and the MLE approach using the following equations:

$$n_{cov} = c^2 \frac{AB + W^2}{(A + B - W)^2} \qquad \text{Eq. 38}$$

$$n_{mle} = c^2 \frac{(AB - W^2)^2}{(A + B - W)^2 (AB + W^2)} \qquad \text{Eq. 39}$$

where $c = z/e$ with z being the z-score of the desired confidence (e.g., z=1.96 for 95% confidence), and e being the relative error as a decimal.

As noted in Table 1, as the overlap increases, the number of elements in the vector (e.g., the vector length) needed to achieve a desired relative error decreases. As a result, the worst case scenario (e.g., when there is no overlap) defines the upper limit on the vector length needed to guarantee the relative error for a given confidence when the actual amount of overlap is unknown. Accordingly, in some examples, the particular vector length needed for the worst case scenario (for a given confidence and relative error) is calculated in advance of the database proprietors 16a-b generating the sketch data 132a-b so that the vector of counts sketch data can be generated with at least the number of elements corresponding to the calculated vector length, thereby guaranteeing that the final estimate for the unique audience will be within the given relative error at the given confidence level.

In particular, the maximum number of elements (e.g., vector length) needed for a given confidence level and relative error can be derived from Equation 39 by recognizing that the equation is scale invariant. That is, the same answer would result if all variables were multiplied by the same scalar value. Thus, it can be assumed, without the loss of generality, that W=1 and A=1+a and B=1+b, where a and b represent the cardinalities of the set of audience members unique exclusively to either the sketch data A 132a or sketch data B 132b, respectively. Further, by symmetry, a and b are treated equally such that the maximum vector length needed would occur if they are both equal to some unknown constant (e.g., a=b=x). With these observations, Equation 39 becomes $$n_{mle} = c^2 \frac{x^2(x+2)^2}{(2x+1)^2(x(x+2)+2)} \quad \text{Eq. 40}$$

The maximum of Equation 39 occurs when $x=1+3^{(1/3)}+3^{(2/3)}=4.52233$. Therefore, the maximum vector length becomes $$[n_{mle}]_{max} = c^2 \left( \frac{19 - 63 \times 3^{(1/3)} + 51 \times 3^{(2/3)}}{125} \right) \quad \text{Eq. 41}$$

which may be expressed in decimal form as $$[n_{mle}]_{max} = 0.27378c^2 \quad \text{Eq. 42}$$

Notably, the vector length defined by Equation 42 does not depend on the size of the datasets or the amount of overlap between the datasets. As a result, Equation 42 can be used to determine the maximum vector length needed to guarantee the relative error for a given confidence level independent of the sketch data and/or information regarding the underlying datasets.

Table 2 provides the maximum number of elements (e.g., vector length) needed for different combinations of confidence levels and relative errors calculated based on Equation 41. The use of the term "maximum" in this context does not mean that a longer vector would not achieve the given relative error at the given confidence level. On the contrary, a longer vector would likely provide increased precision. Rather, the term "maximum" is used in this context to define the vector length needed to guarantee the given relative error and confidence level even in the worst case scenario of no overlap between the dataset (when the vector would need to be the longest). That is, it is the "maximum" vector length needed to account for all possible scenarios including the worst case scenario. However, there will be situations where shorter vectors would be sufficient to achieve the particular confidence level and relative error (e.g., when there is more overlap between the dataset).

TABLE 2

Maximum Number of Elements (e.g., Vector Length) Needed in MLE Approach for Particular Relative Error at Particular Confidence

| Confidence | Relative Error | | |
|---|---|---|---|
| | 10% | 5% | 1% |
| 90% | 75 | 297 | 7,408 |
| 95% | 1061 | 42 | 10,518 |
| 99% | 182 | 727 | 18,166 |

As mentioned above, in some examples, the database proprietors 106a-b may insert noise into the sketch data 132a-b to increase the privacy of subscribers represented in the sketch data. The discussion of Equations 15-42 outlined above assumes that there is no noise. However, the above process may be generalized to estimate the overlap W between two vectors of counts whether or not noise is included in the data so long as the variance of the noise terms added to each vector of counts is also provided. For example, assume the first database proprietor 106a generates vector of counts $V_A$ represented in Equation 43 (which corresponds to the vector counts provided above in Equation 10).

$$V_A = \{90,109,117,110,115,91,80,98,92,98\} \quad \text{Eq. 43}$$

After generating this initial vector of counts, the database proprietor 106a may add a random noise term to each element in the vector as represented by the following:

$$V_A' = \{90+(-33.3564),109+(-61.6437),\} \quad \text{Eq. 44}$$

In this example, averaging or mean-centering the noisy vector yields $$X_A' = \{-68.5763, -77.8636, -12.0021, 36.4295, -6.92108\ 329.535, -120.591, -116.239, 16.5112,\ 19.7176\} Eq. 45$$

The above example may be generalized (relative to Equation 15 above) as a bivariate normal distribution as $$\mu = \begin{pmatrix} 0 \\ 0 \end{pmatrix}, \Sigma = \begin{pmatrix} Ac + V_1 & Wc \\ Wc & Bc + V_2 \end{pmatrix} \quad \text{Eq. 46}$$

where $V_1$ and $V_2$ are the variances of the noise added to each of the vector of counts for the sketch data 132a-b from each of the two database proprietors 106a-b. When there is no noise, the variances become zero (e.g., $V_1=V_2=0$) and the coefficients for the third-degree polynomial defined in Equation 19 reduce to the coefficients as outlined above in Equations 20-23. However, when noise has been added (e.g., $V_1 \neq 0$ and/or $V_2 \neq 0$), the coefficients for the third-degree polynomial are defined by $$c_0 = -\frac{1}{c^2}(Ac + V_1)(Bc + V_2)V_{V_A V_B} \quad \text{Eq. 47}$$

$$c_1 = \frac{1}{c}\left((Ac + V_1)V_{V_B} + (Bc + V_2)V_{V_A} - (Ac + V_1)(Bc + V_2)\right) \quad \text{Eq. 48}$$

$$c_2 = -V_{V_A V_B} \quad \text{Eq. 49}$$

$$c_3 = c \quad \text{Eq. 50}$$

The expected value and the variance for the estimate $\hat{W}$ using the MLE method by solving for the real root of Equation 19 based on the above coefficients is.

$$E[\hat{W}] = W \qquad \text{Eq. 51}$$

$$\text{Var}[\hat{W}] = \frac{((Ac+V_1)(Bc+V_2)-c^2W^2)^2}{nc^2((Ac+V_1)(Bc+V_2)+c^2W^2)} \qquad \text{Eq. 52}$$

Figure 2:
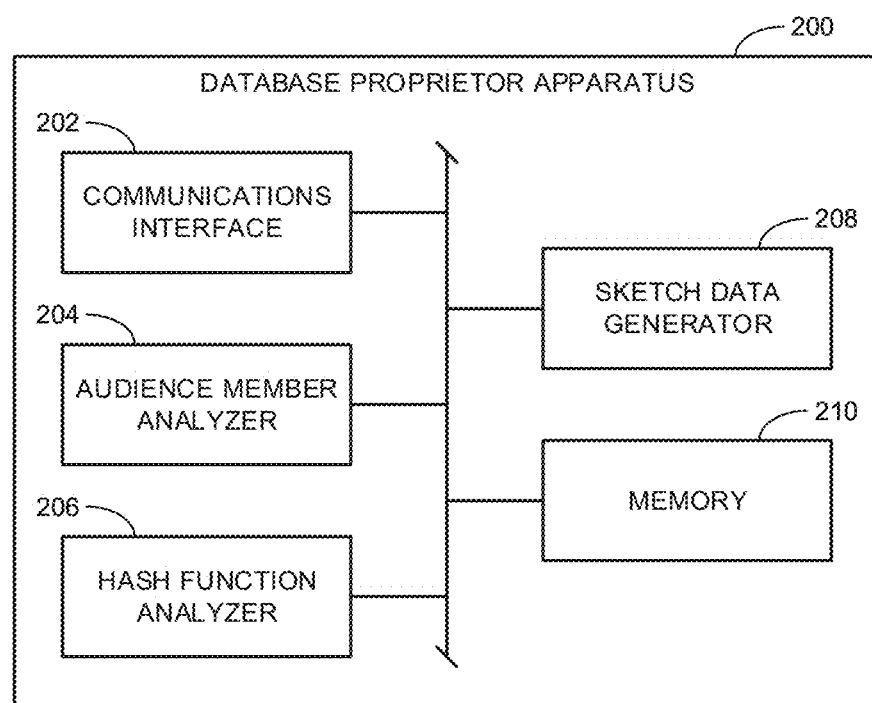
FIG. 2 is an example database proprietor apparatus that may be implemented by either one of the example database proprietors of FIG. 1 to generate and provide sketch data to the example audience measurement entity of FIG. 1 for use in estimating audience sizes of media in accordance with teachings disclosed herein.

FIG. 2 is an example database proprietor apparatus 200 that may be implemented by either one of the example database proprietors 106a-b of FIG. 1 to generate and provide the sketch data 132a-b to the example AME 102 of FIG. 1. More particularly, in some examples, the database proprietor apparatus 200 may correspond to and/or include either of the database proprietor servers 118a-b and/or the corresponding database proprietor audience metrics databases 124a-b of FIG. 1. As shown in FIG. 2, the example database proprietor apparatus 200 includes an example communications interface 202, an example audience member analyzer 204, an example hash function analyzer 206, an example sketch data generator 208, and example memory 210.

The example communications interface 202 of FIG. 2 enables communications with client devices 108 to obtain the impression requests 122a-b for audience measurement purposes. Additionally or alternatively, the example communications interface 202 enables communications with the AME 102. In some examples, the communications interface 202 receives information from the AME 102 requesting particular sketch data 132a-b representative of audience members exposed to a particular media item 114. In some examples, the AME 102 may provide parameters defining how the sketch data 132a-b is to be generated. For example, the AME 102 may define the length of the vector of counts for the sketch data 132a-b. Further, the AME 102 may define the particular hash function and any subsequent procedures to transform the outputs of the hash function into integer values defining the particular elements within the vector of counts to be incremented. In some examples, these sketch data generation parameters may be stored in the example memory 210 for subsequent retrieval and use. Obtaining these parameters from the AME 102 ensures that each database proprietor 106a-b generates sketch data 132a-b using the same hash functions. In some examples, the communications interface 202 enables communications with other database proprietors 106a-b so that the sketch data generation parameters may be agreed upon between the different database proprietors 106a-b (whether or not the AME 102 is involved in the communications). Further, the example communications interface 202 enables the database proprietor apparatus 200 to transmit the generated sketch data 132a-b to the AME 102 for subsequent processing (e.g., to estimate unique audience sizes based on the sketch data 132a-b collected from multiple different database proprietors 106a-b).

The example audience member analyzer 204 analyzes data in the example database proprietor audience metrics databases 124a-b to identify particular subscribers of the database proprietor 106a-b that constitute audience members who accessed or were otherwise exposed to particular media item(s) of interest to the AME 102 for estimating audience sizes. The audience members identified by the audience member analyzer 204 will correspond to subscribers for which the corresponding database proprietor 106a-b has PII data. The PII data for such subscribers/audience members is used as inputs for the hashing function that serves as the basis to generate the values in the vector of counts for the sketch data 132a-b. The subscribers/audience members identified by the audience member analyzer 204 define the pool of individuals represented by the sketch data 132a-b to be generated as described above and further outlined below. In some examples, the database proprietor audience metrics database 124a-b accessed by the audience member analyzer 204 corresponds to and/or is included in the example memory 210. In other examples, the database proprietor audience metrics database 124a-b may be implemented externally to the example database proprietor apparatus 200. In such examples, the audience member analyzer 204 may access the database proprietor audience metrics database 124a-b through the communications interface 202.

The example hash function analyzer 206 implements the hash function defined for the sketch data generation across the PII data associated with each of the subscribers identified by the example audience member analyzer 204. In some examples, when more than one hash function is to be used, the hash function analyzer 206 determines which hash function to use and/or the number of hash functions to use. That is, in some examples, rather than receiving the sketch data generation parameters from the AME 102, the parameters may be determined locally by the hash function analyzer 206

Once the hash function analyzer 206 generates an output of the relevant hash function for a particular subscriber to be included in the sketch data, the example sketch data generator 208 transforms the output to an integer value. The example sketch data generator 208 uses the integer value to identify the particular element within the vector of counts to which the particular subscriber is to be allocated. Accordingly, the example sketch data generator 208 increments the particular element of the vector of counts corresponding to the integer value derived from the output of the hash function.

In some examples, the hash function analyzer 206 and the sketch data generator 208 repeat this process for each subscriber to be represented in the sketch data 132a-b. In some examples, after corresponding ones of the elements in the vector of counts have been incremented for each subscriber to be included, the sketch data generator 208 adds noise to the vector of counts to increase the anonymity of the data by increasing the level of privacy. If the sketch data generator 208 adds noise, the sketch data generator 208 may also determine a variance of the noise added across the different elements of the sketch data 132a-b. Additionally or alternatively, in some examples, the sketch data generator 208 counts the total number of audience members identified by the audience member analyzer 204 that are represented in the sketch data 132a-b. This number is referred to herein as the cardinality of the sketch data 132a-b. In some examples, the audience member analyzer 204 may provide the cardinality of the sketch data 132a-b to the sketch data generator 208. In some examples, the vector of counts for the sketch data 123a-b, the variance of the noise added to the vector of counts, and the cardinality for the sketch data 132a-b generated by the sketch data generator are provided to the AME 102 by the communications interface 202. If no noise is added, the cardinality of the sketch data 132a-b corresponds to the sum of values across all elements of the vector of counts. Accordingly, in some examples, the sketch data generator 208 may not separately count and/or provide the cardinality of the sketch data.

While an example manner of implementing the database proprietor apparatus 200 is illustrated in FIG. 2, one or more of the elements, processes and/or devices illustrated in FIG. 2 may be combined, divided, re-arranged, omitted, eliminated and/or implemented in any other way. Further, the example communications interface 202, the example audience member analyzer 204, the example hash function analyzer 206, the example sketch data generator 208, the example memory 210, and/or, more generally, the example database proprietor apparatus 200 of FIG. 2 may be implemented by hardware, software, firmware and/or any combination of hardware, software and/or firmware. Thus, for example, any of the example communications interface 202, the example audience member analyzer 204, the example hash function analyzer 206, the example sketch data generator 208, the example memory 210 and/or, more generally, the example database proprietor apparatus 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 202, the example audience member analyzer 204, the example hash function analyzer 206, the example sketch data generator 208, and/or the example memory 210 is/are hereby expressly defined to include a non-transitory computer readable storage device or storage disk such as a memory, a digital versatile disk (DVD), a compact disk (CD), a Blu-ray disk, etc. including the software and/or firmware. Further still, the example database proprietor apparatus 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
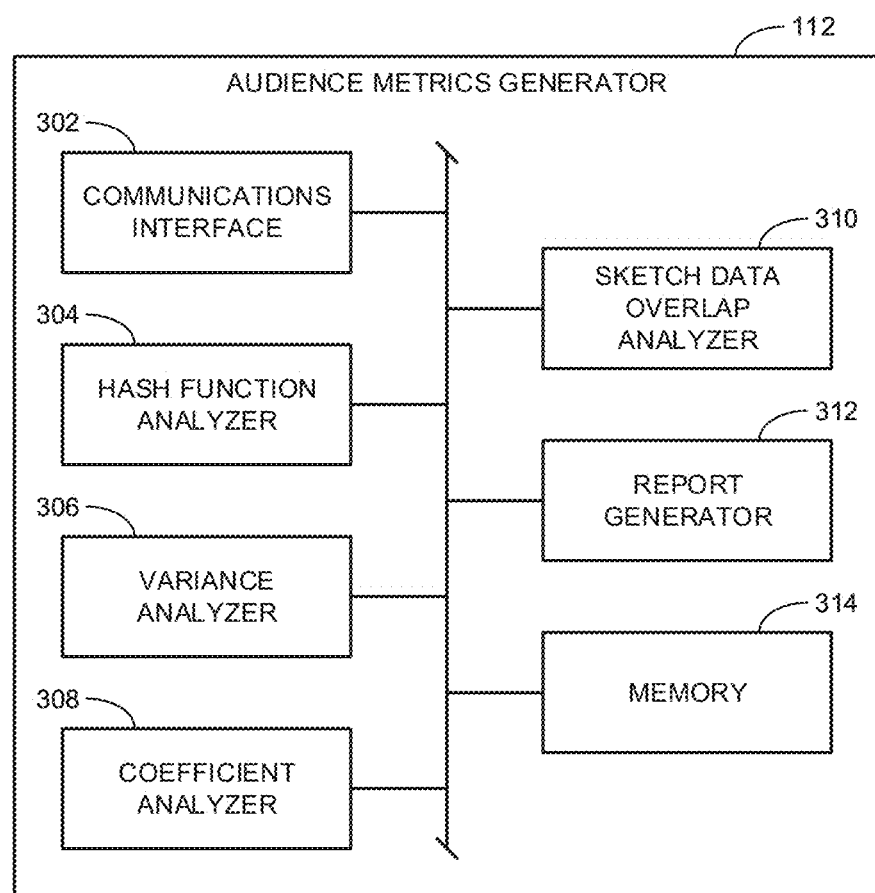
FIG. 3 is an example implementation of the example audience metrics generator of FIG. 1 to estimate audience sizes of media in accordance with teachings disclosed herein.

FIG. 3 is an example implementation of the example audience metrics generator 112 of FIG. 1 to estimate audience sizes of media in accordance with teachings disclosed herein. As shown in FIG. 3, the example audience metrics generator 112 includes an example communications interface 302, an example hash function analyzer 304, an example variance analyzer 306, an example coefficient analyzer 308, an example sketch data overlap analyzer 310, and an example report generator 312.

The example communications interface 302 of FIG. 3 enables the audience metrics generator 112 to communicate with the database proprietors 106a-b and/or the client devices 108. That is, in some examples, the communications interface 302 receives the impression requests 122c from the client devices. Further, in some examples, the communications interface 302 receives the sketch data 132a-b from the database proprietors. Further, in some examples, the communications interface 302 transmits or provides sketch data generation parameters to the database proprietors 106a-b to enable the database proprietors 106a-b to generate the sketch data 132a-b so that the data can be combined and analyzed in accordance with teachings disclosed herein. In some examples, the sketch data generation parameters define the length of the vector of counts, the hash function used to allocate subscribers to the vector of counts, and/or the transformation procedures to convert outputs of the hash function to integer values that identify the particular elements in the vector for incrementation. In some examples, these parameters are determined by the hash function analyzer 304. In other examples, one or more of the database proprietors 106a-b may determine the sketch data generation parameters (e.g., via the hash function analyzer 206 of FIG. 2).

The example variance analyzer 306 of FIG. 3 determines the variance of each vector for the sketch data 132a-b received from each of the database proprietors 106a-b. In some examples, the variance analyzer 306 determines the variance for each vector based on raw data by evaluating Equations 16 and 17. In some examples, the variance analyzer 306 determines a normalized variance for each of the vectors by evaluating Equation 30 and 31. Further, the example variance analyzer 306 also determines the covariance of both vectors of the sketch data 132a-b. In some examples, the variance analyzer 306 determines the covariance based on raw data by evaluating Equation 18. In some examples, the variance analyzer 306 determines a normalized covariance by evaluating Equation 32.

The example coefficient analyzer 308 of FIG. 3 determines the values for the coefficients in the third-degree polynomial of Equation 19 by evaluating Equations 20-23 based on the outputs of the variance analyzer 306 evaluating Equations 16-18. In some examples, the coefficient analyzer 308 determines normalized coefficient values for the polynomial of Equation 33 by evaluating Equations 34-37 based on the outputs of the variance analyzer 306 evaluating Equations 30-32. In some examples, when the sketch data 132a-b includes noise, the coefficient analyzer 308 determines coefficient values for the polynomial of Equation 19 by evaluating Equations 47-50 based on the outputs of the variance analyzer 306 evaluating Equations 20-23 along with the variances for the added noise as provided by the database proprietors 106a-b.

Once the coefficient analyzer 308 has determined the coefficients for the polynomial (either Equation 19 or Equation 33), the example sketch data overlap analyzer 310 determines an estimate ($\hat{W}$) for the overlap between the sketch data 132a from the database proprietor A 106a and the sketch data 132b from the database proprietor 106b. More particularly, in some examples, the sketch data overlap analyzer 310 determines the estimate of the overlap by solving the polynomial of either Equation 19 or Equation 33 to identify the roots for the polynomial. When Equation 19 is evaluated, the real root of the equation directly defines the estimate ($\hat{W}$) for the overlap between the sketch data 132a-b from the two database proprietors 106a-b. When Equation 33 is evaluated, the roots of the equation define the estimate ($\hat{W}$) for the overlap divided by the cardinality of the smaller dataset between both sketch data 132a-b. Thus, in some such examples, the sketch data overlap analyzer 310 determines the estimate of the overlap by multiplying the root of the polynomial by the cardinality of the smaller dataset. In some examples, the sketch data overlap analyzer 310 solves the polynomial using any suitable commercial solver. In some examples, there may be a multiplicity of roots and/or complex roots. However, the example sketch data overlap analyzer 310 selects a real root that makes logical sense in relation to the cardinalities of sketch data 132a-b and the unique audience size as defined in Equation 1. That is, the selected root must indicate an estimate ($\hat{W}$) for the overlap between the sketch data 132a-b that is a real number with a value ranging from 0 to the smaller cardinality of the two datasets being analyzed.

The example report generator 312 of FIG. 3 determines a final estimate for the unique audience. In some examples, the unique audience estimate is determined by evaluating Equation 1 based on the cardinalities (e.g., A and B) of the sketch data 132a-b as provided by the database proprietors 106a-b and the overlap estimate (e.g., $\hat{W}$) as determined by the sketch data overlap analyzer 310. As mentioned above, in some examples, each subscriber may be added to the vector of counts more than one time by using more than one hash function. In such examples, the sum of all elements in the vector of counts corresponds to the cardinality multiplied by the number of hash functions used. Thus, to arrive at the final estimation for the unique audience, the report generator 312 may divide the solution to Equation 1 by the number of hash functions.

In some examples, the report generator 312 generates a report and/or otherwise transforms the output unique audience estimate in a form that an interested receiving party (e.g., a client or customer of the AME 102) can understand. In some examples, the report may include both the overlap estimate $\hat{W}$ and the unique audience UA listed which explains the demographics reached by the particular media item associated with the sketch data 132a-b provided by the database proprietors 106a-b.

The example memory 314 of FIG. 3 stores information received from the client devices 108 (e.g., the impression requests 122c) and/or the database proprietors 106a-b (e.g., the sketch data 132a). Further, in some examples, the memory 314 stores data generated by one or more of the example hash function analyzer 304, the example variance analyzer 306, the example coefficient analyzer 308, the example sketch data overlap analyzer 310, the example report generator 312. In some examples, the memory 314 corresponds to and/or includes the audience metrics database 126 of FIG. 1. In other examples, the audience metrics database 126 is implemented independent of the memory 314. In some such examples, data may be transferred between the example memory 314 and the audience metrics database 126 via the communications interface 302.

While an example manner of implementing the audience metrics generator 112 of FIG. 1 is illustrated in FIG. 3, one or more of the elements, processes and/or devices illustrated in FIG. 3 may be combined, divided, re-arranged, omitted, eliminated and/or implemented in any other way. Further, the example communications interface 302, the example hash function analyzer 304, the example variance analyzer 306, the example coefficient analyzer 308, the example sketch data overlap analyzer 310, the example report generator 312, the example memory 314, and/or, more generally, the example audience metrics generator 112 of FIG. 3 may be implemented by hardware, software, firmware and/or any combination of hardware, software and/or firmware. Thus, for example, any of the example communications interface 302, the example hash function analyzer 304, the example variance analyzer 306, the example coefficient analyzer 308, the example sketch data overlap analyzer 310, the example report generator 312, the example memory 314 and/or, more generally, the example audience metrics generator 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 302, the example hash function analyzer 304, the example variance analyzer 306, the example coefficient analyzer 308, the example sketch data overlap analyzer 310, the example report generator 312, and/or the example memory 314 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience metrics generator 112 of FIG. 1 may include one or more elements, processes and/or devices in addition to, or instead of, those illustrated in FIG. 3, and/or may include more than one of any or all of the illustrated elements, processes and devices.

Figure 4:
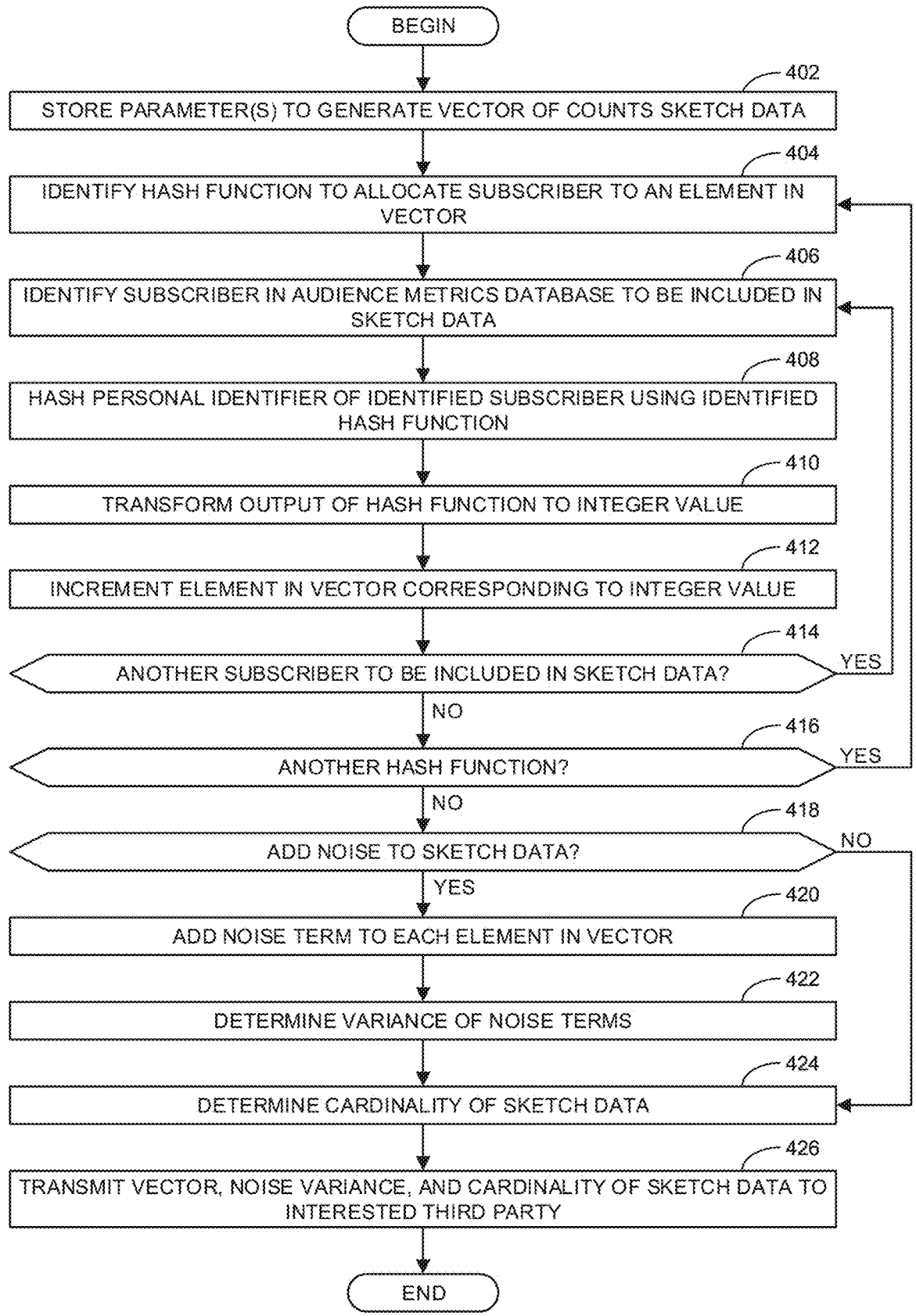
FIG. 4 is a flowchart representative of machine-readable instructions which may be executed to implement the example database proprietor apparatus of FIG. 2 to generate sketch data in accordance with teachings disclosed herein.

A flowchart representative of example hardware logic, machine readable instructions, hardware implemented state machines, and/or any combination thereof for implementing the database proprietor apparatus 200 of FIG. 2 is shown in FIG. 4. The machine readable instructions may be one or more executable programs or portion(s) of an executable program for execution by a computer processor and/or processor circuitry, such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 4, many other methods of implementing the example database proprietor apparatus 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 5:
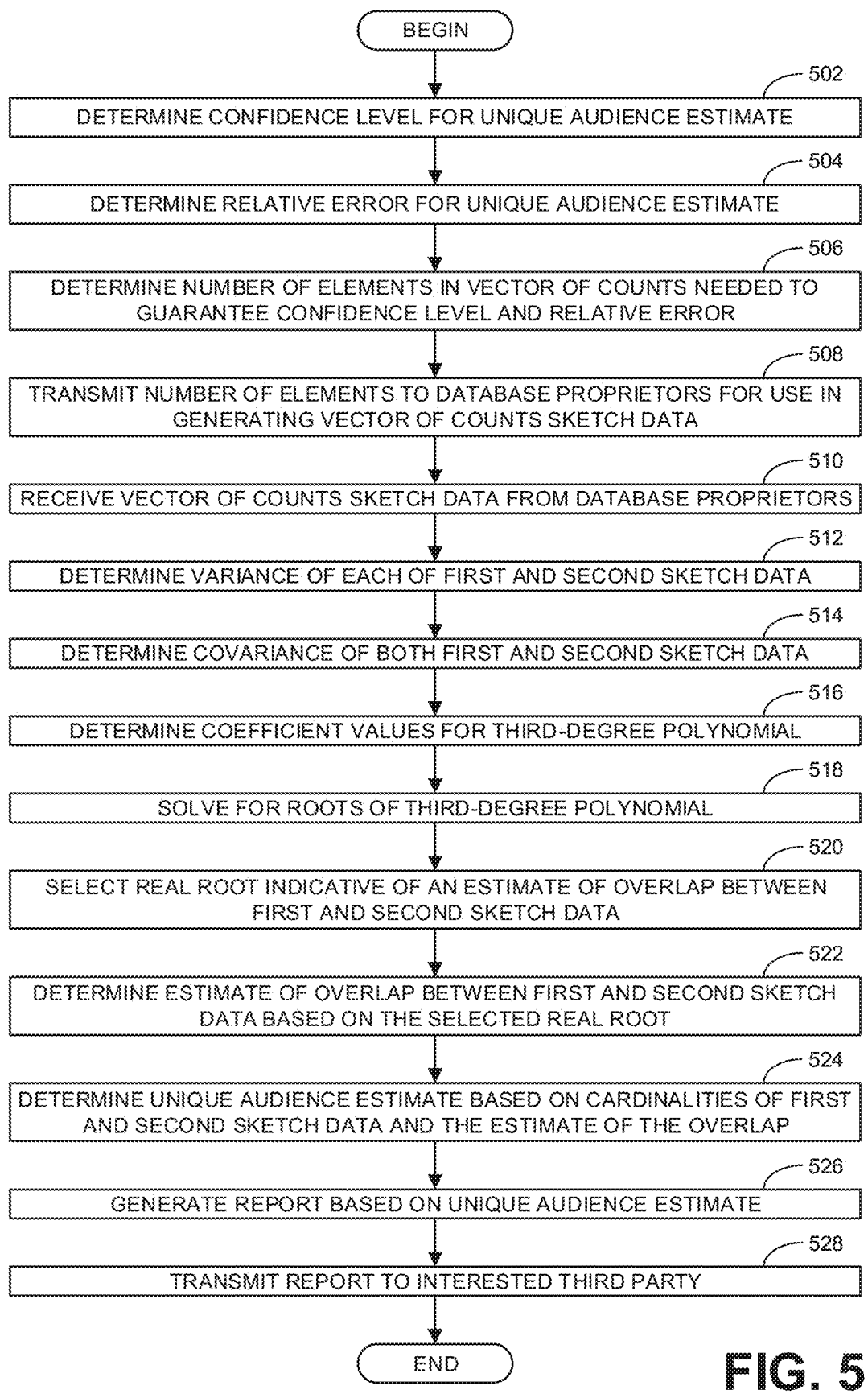
FIG. 5 is a flowchart representative of machine-readable instructions which may be executed to implement the example audience metrics generator of FIGS. 1 and/or 3 to estimate audience sizes in accordance with teachings disclosed herein.

A flowchart representative of example hardware logic, machine readable instructions, hardware implemented state machines, and/or any combination thereof for implementing the audience metrics generator 112 of FIGS. 1 and/or 3 is shown in FIG. 5. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 5, many other methods of implementing the example audience metrics generator 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4 and 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of machine-readable instructions which may be executed to implement the example database proprietor apparatus 200 of FIG. 2 to generate sketch data 132*a-b* in accordance with teachings disclosed herein. In some examples, both database proprietors 106a-b will separately implement the flowchart of FIG. 4. However, for the sake of clarity, the flowchart of FIG. 4 will be described with reference to database proprietor A 106a.

The example program of FIG. 4 begins at block 402 at which the example memory 210 (FIG. 2) stores parameter(s) to generate vector of counts sketch data. In some examples, the parameters include the particular hash function (or multiple hash functions) used, the procedure to transform the output of the hash function(s) to an integer value to identify a particular element within the vector, and/or the number of elements to be included in the vector (e.g., the vector length). In some examples the sketch data generation parameters are provided by the AME 102. Additionally or alternatively, in some examples, at least some of the parameters may be generated by the hash function analyzer 206 (FIG. 2) of the database proprietor apparatus 200.

At block 404, the example hash function analyzer 206 identifies a hash function to allocate subscribers to an element in a vector for the sketch data (e.g., the sketch data 132a). At block 406, the example audience member analyzer 204 (FIG. 2) identifies a subscriber in an audience metrics database (e.g., the audience metrics databases 126a) to be included in the sketch data 132a. In some examples, a particular subscriber is identified for inclusion in the sketch data when the database proprietor 106a received at least one impression request 122a from the subscriber indicating the subscriber accessed and/or was exposed to particular media item 114 of interest for the sketch data 132a. At block 406, the example hash function analyzer 206 hashes a personal identifier (e.g., PII data) of the identified subscriber using the identified hash function. At block 410, the example hash function analyzer 206 transforms the output of the hash function to an integer value. In this example, the integer value may correspond to any element of the vector. More particularly, in some examples, the hash function and the subsequent transformation procedure are designed such that the integer value corresponding to any particular element in the vector is equally likely as the integer value corresponding to any other element in the vector. At block 412, the example sketch data generator 208 (FIG. 2) increments the element in the vector corresponding to the integer value.

At block 414, the example audience member analyzer 204 determines whether there is another subscriber to be included in the sketch data. If so, control returns to block 406. Otherwise, control advances to block 416 where the example hash function analyzer 206 determines whether there is another hash function. If so, control returns to block 404 where a new hash function is identified to repeat the process to allocate all subscribers to the vector of counts a second time. In some examples, only a single hash function may be used such that block 404 and 416 may be omitted. If there are no more hash functions to be applied, control advances to block 418.

At block 418, the example sketch data generator 208 determines whether to add noise to the sketch data. If so, control advances to block 420 where the example sketch data generator 208 adds a noise term to each element in the vector. In some examples, the noise terms may be randomly generated. At block 422, the example sketch data generator 208, determines the variance of the noise terms. Thereafter, control advances to block 424. If, at block 418, the example sketch data generator 208 determines not to add noise to the sketch data, control advances directly to block 424. At block 424, the example sketch data generator 208 determines the cardinality of the sketch data. In some examples, block 424 may be omitted because the cardinality may be derived directly from the vector of counts by summing the values across every element in the vector. At block 426, the example communications interface 202 transmits the vector, the noise variance, and the cardinality of the sketch data 132a to an interested third party (e.g., the AME 102). Thereafter, the example instructions of FIG. 4 ends.

FIG. 5 is a flowchart representative of machine-readable instructions which may be executed to implement the example audience metrics generator 112 of FIGS. 1 and/or 3 to estimate audience sizes in accordance with teachings disclosed herein. The example program of FIG. 5 begins at block 502 where the example hash function analyzer 304 (FIG. 3) determines a confidence level for a unique audience estimate. At block 504, the example hash function analyzer 304 determines a relative error for the unique audience estimate. In some examples, the confidence level (block 502) and the relative error (block 504) may be user-specified. At block 506, the example hash function analyzer 304 determines the number elements in the vector of counts (e.g., the vector length) needed to guarantee the confidence level and the relative error. In some examples, the hash function analyzer 304 determines the number of hash functions needed by evaluating Equation 42. At block 508, the example communications interface 302 (FIG. 3) transmits the number of elements to the database proprietors 106a-b for use in generating vector of counts sketch data 132a-b. In some examples, the communications interface 302 may transmit other sketch data generating parameters generated by the hash function analyzer 304 and/or otherwise agreed upon between the AME 102 and the database proprietors 106a-b. In some examples, blocks 502-508 may be omitted. In some such examples, the hash function analyzer 206 (FIG. 2) of the database proprietor apparatus 200 of one of the database proprietors 106a-b may perform the operations of blocks 502-508.

At block 510, the example communications interface 302 receives the vector of counts sketch data 132a-b from the database proprietors 106a-b. In some examples, the sketch data 132a-b is generated based on the implementation of the flowchart of FIG. 4 described above. At block 512, the example variance analyzer 306 (FIG. 3) determines the variance of each of the first and second sketch data 132a-b. At block 514, the example variance analyzer 306 (FIG. 3) determines the covariance of both the first and second sketch data 132a-b. The particular equations evaluated by the example variance analyzer 306 to determine the variances (block 512) and covariance (block 514) of the sketch data 132a-b may depend on whether the data is to be normalized. If the raw data is to be used without normalization, the example variance analyzer 306 determines the variances and the covariance by evaluating Equations 16-18. If normalized data is to be used (e.g., to reduce concerns for the potential of loss of numerical precision), the example variance analyzer 306 determines the variances and the covariance by evaluating Equations 30-32.

At block 516, the example coefficient analyzer 308 (FIG. 3) determines coefficient values for a third-degree polynomial. The manner in which the third-degree polynomial and the corresponding coefficients are defined depends on whether the variance analyzer 306 calculated the raw variances and covariance for the sketch data 132a-b or the normalized variances and covariance for the sketch data 132a-b. Further, the manner in which the coefficients are determined depends on whether the sketch data 132a-b includes noise. If the raw variances and covariances for the sketch data 132a-b are used and no noise is included, then the polynomial is defined by Equation 19 and the example coefficient analyzer 308 determines the coefficient values for the polynomial based on Equations 20-23. If noise is included, then the example coefficient analyzer 308 determines the coefficient values for the polynomial defined in Equation 19 based on Equations 47-50. If the normalized variances and covariances for the sketch data 132a-b are used, then the polynomial is defined by Equation 33 and the example coefficient analyzer 308 determines the coefficient values for the polynomial based on Equations 34-37.

At block 518, the example sketch data overlap analyzer 310 (FIG. 3) solves for the roots of the third-degree polynomial. As mentioned above, the third-degree polynomial may correspond to either Equation 19 (for raw data) or Equation 31 (for normalized data). At block 520, the example sketch data overlap analyzer 310 selects a real root indicative of an estimate of the overlap between the first and second sketch data 132a-b. At block 522, the example sketch data overlap analyzer 310 determines the estimate of the overlap between the first and second sketch data 132a-b based on the selected real root. In examples where the polynomial corresponds to Equation 19 (associated with the raw data), the real root directly corresponds to the estimate of the overlap. In examples where the polynomial corresponds to Equation 31 (associated with the normalized data), the real root corresponds to the estimate of the overlap divided by the cardinality of the sketch data A 132a (assuming the cardinality of the sketch data A 132a is less than or equal to the cardinality of the sketch data B 132b). Accordingly, in such examples, the sketch data overlap analyzer 310 determines the estimate of the overlap by multiplying the selected real root by the cardinality of the sketch data A 132a.

At block 524, the example report generator 312 determines a unique audience estimate based on the cardinalities of the first and second sketch data 132a-b and the estimate of the overlap. More particularly, in some examples, the report generator 312 determines the unique audience estimate by evaluating Equation 1. In some examples, where more than one hash function were used, the example report generator 312 may divide the solution to Equation 1 by the number of hash function used to arrive at the final unique audience estimate. At block 526, the example report generator 312 generates a report based on the unique audience estimate. At block 528, the example report generator 312 transmits the report to an interested third party. Thereafter, the example process of FIG. 5 ends.

Figure 6:
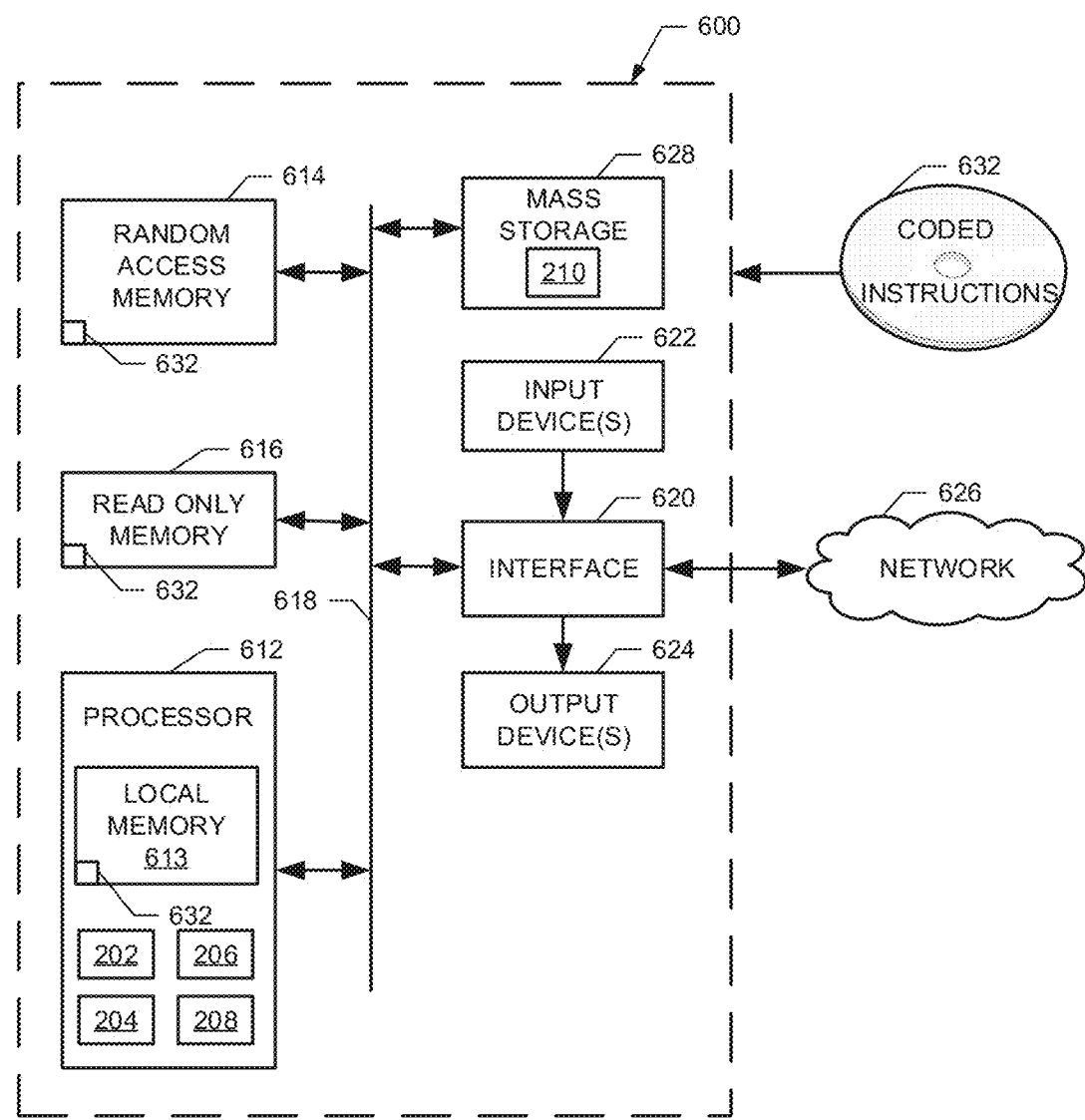
FIG. 6 is a block diagram of an example processing platform structured to execute the instructions of FIG. 4 to implement the example database proprietor apparatus of FIG. 2 to generate sketch data in accordance with teachings disclosed herein.

FIG. 6 is a block diagram of an example processor platform 600 structured to execute the instructions of FIG. 4 to implement the example database proprietor apparatus 200 of FIG. 2. The processor platform 600 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example communications interface 202, the example audience member analyzer 204, the example hash function analyzer 206, and the example sketch data generator 208.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives. In this example, the one or more mass storage devices 628 implements the example memory 210 of FIG. 2.

The machine executable instructions 632 of FIG. 4 may be stored in the mass storage device 628, in the volatile memory 614, in the non-volatile memory 616, and/or on a removable non-transitory computer readable storage medium such as a CD or DVD.

Figure 7:
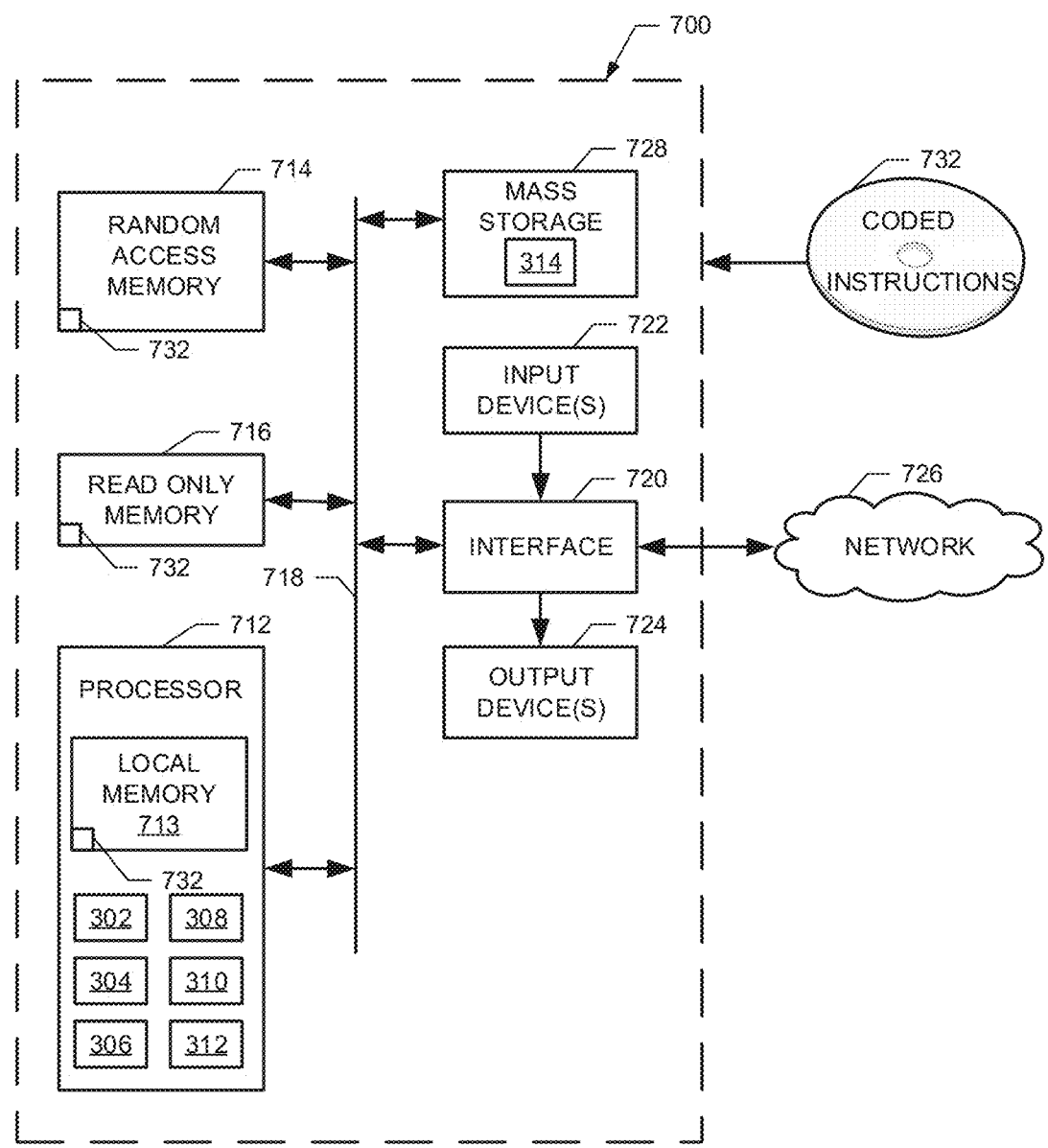
FIG. 7 is a block diagram of an example processing platform structured to execute the instructions of FIG. 5 to implement the example audience metrics generator of FIGS. 1 and/or 3 to estimate audience sizes in accordance with teachings disclosed herein.

FIG. 7 is a block diagram of an example processor platform 700 structured to execute the instructions of FIG. 5 to implement the example audience metrics generator 112 of FIGS. 1 and/or 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example communications interface 302, the example hash function analyzer 304, the example variance analyzer 306, the example coefficient analyzer 308, the example sketch data overlap analyzer 310, and the example report generator 312.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 5 may be stored in the mass storage device 728, in the volatile memory 714, in the non-volatile memory 716, and/or on a removable non-transitory computer readable storage medium such as a CD or DVD. In this example, the one or more mass storage devices 628 implements the example memory 314 of FIG. 3.

From the foregoing, it will be appreciated that example methods, apparatus and articles of manufacture have been disclosed that enable the estimation of a unique audience based on sketch data from two separate database proprietors without knowing the overlap of audience members represented across the two datasets. More particularly, examples disclosed herein improve upon estimations based solely on the covariance of the sketch data to provide more accurate and/or precise unique audience estimates. Moreover, examples disclosed herein achieve the more precise estimates with less computer processing resources and/or computer memory capacity than the covariance approach because the length of the vectors for the sketch data can be shorter relative to the vector lengths needed using the covariance method to achieve the same level of accuracy and/or precision. Therefore, the disclosed methods, apparatus and articles of manufacture improve the efficiency of using a computing device. As such, the disclosed methods, apparatus and articles of manufacture are directed to one or more improvement(s) in the functioning of a computer.

Example methods, apparatus, systems, and articles of manufacture to estimate audience sizes using deduplication based on vector of counts sketch data are disclosed herein. Further examples and combinations thereof include the following:

Example 1 includes an apparatus to estimate an audience size for media based on vector of counts sketch data, the apparatus comprising a coefficient analyzer to determine coefficient values of a polynomial based on variances, a covariance, and cardinalities corresponding to a first vector of counts from a first database and a second vector of counts from a second database, an overlap analyzer to determine a real root of the polynomial, the real root corresponding to an estimate of an overlap between the first vector of counts and the second vector of counts, and a report generator to estimate the audience size based on the estimate of the overlap and the cardinalities of the first vector of counts and the second vector of counts.

Example 2 includes the apparatus of example 1, wherein the first database is associated with a first database proprietor and the second database is associated with a second database proprietor, the first vector of counts to have a first number of elements, ones of the elements in the first vector of counts corresponding to total numbers of first subscribers of the first database proprietor allocated to the respective ones of the elements in the first vector of counts based on a hash function applied to information associated with first subscribers, the first subscribers having been exposed to the media.

Example 3 includes the apparatus of example 2, wherein the second vector of counts is to have a second number of elements the same as the first number, ones of the elements in the second vector of counts corresponding to total numbers of second subscribers of the second database proprietor allocated to the respective ones of the elements in the second vector of counts based on the hash function applied to information associated with second subscribers, the second subscribers having been exposed to the media.

Example 4 includes the apparatus of example 3, wherein the overlap between the first vector of counts and the second vector of counts corresponds to a number of the first subscribers that are the same as the second subscribers.

Example 5 includes the apparatus of example 2, wherein allocations of the first subscribers to ones of the elements in the first vector of counts is based on an integer value derived from an output of the hash function applied to the information associated with respective ones of the first subscribers.

Example 6 includes the apparatus of example 5, wherein possible values for the integer value range from one up to the first number of elements.

Example 7 includes the apparatus of example 2, wherein the information is personally identifiable information.

Example 8 includes the apparatus of example 2, wherein the first number of elements is selected to provide a relative error in the audience size estimate no greater than a particular relative error at a particular confidence level.

Example 9 includes the apparatus of example 1, wherein the coefficient analyzer is to normalize the coefficient values based on a first cardinality of the first vector of counts, the first cardinality being less than or equal to a second cardinality of the second vector of counts.

Example 10 includes the apparatus of example 9, wherein the estimate of the overlap corresponds to the real root multiplied by the first cardinality.

Example 11 includes the apparatus of example 1, wherein elements in the first vector of counts include respective noise terms added to underlying raw data represented by the first vector of counts, the overlap analyzer to determine the real root based on a variance of the respective noise terms.

Example 12 includes a non-transitory computer readable medium comprising instructions that, when executed, cause a machine to at least determine coefficient values of a polynomial based on variances, a covariance, and cardinalities corresponding to a first vector of counts from a first database and a second vector of counts from a second database, determine a real root of the polynomial, the real root corresponding to an estimate of an overlap between the first vector of counts and the second vector of counts, and estimate an audience size for media based on the estimate of the overlap and the cardinalities of the first vector of counts and the second vector of counts.

Example 13 includes the non-transitory computer readable medium of example 12, wherein the first database is associated with a first database proprietor and the second database is associated with a second database proprietor, the first vector of counts to have a first number of elements, ones of the elements in the first vector of counts corresponding to total numbers of first subscribers of the first database proprietor allocated to the respective ones of the elements in the first vector of counts based on a hash function applied to information associated with first subscribers, the first subscribers having been exposed to the media.

Example 14 includes the non-transitory computer readable medium of example 13, wherein the second vector of counts is to have a second number of elements the same as the first number, ones of the elements in the second vector of counts corresponding to total numbers of second subscribers of the second database proprietor allocated to the respective ones of the elements in the second vector of counts based on the hash function applied to information associated with second subscribers, the second subscribers having been exposed to the media.

Example 15 includes the non-transitory computer readable medium of example 14, wherein the overlap between the first vector of counts and the second vector of counts corresponds to a number of the first subscribers that are the same as the second subscribers.

Example 16 includes the non-transitory computer readable medium of example 13, wherein allocations of the first subscribers to ones of the elements in the first vector of counts is based on an integer value derived from an output of the hash function applied to the information associated with respective ones of the first subscribers.

Example 17 includes the non-transitory computer readable medium of example 16, wherein possible values for the integer value range from one up to the first number of elements.

Example 18 includes the non-transitory computer readable medium of example 13, wherein the information is personally identifiable information.

Example 19 includes the non-transitory computer readable medium of example 13, wherein the first number of elements is selected to provide a relative error in the audience size estimate no greater than a particular relative error at a particular confidence level.

Example 20 includes the non-transitory computer readable medium of example 12, wherein the instructions when executed cause the machine to normalize the coefficient values based on a first cardinality of the first vector of counts, the first cardinality being less than or equal to a second cardinality of the second vector of counts.

Example 21 includes the non-transitory computer readable medium of example 20, wherein the estimate of the overlap corresponds to the real root multiplied by the first cardinality.

Example 22 includes the non-transitory computer readable medium of example 12, wherein elements in the first vector of counts include respective noise terms added to underlying raw data represented by the first vector of counts, the instructions further causing the machine to determine the real root based on a variance of the respective noise terms.

Example 23 includes a method to estimate an audience size for media based on vector of counts sketch data, the method comprising determining, by executing an instruction with a processor, coefficient values of a polynomial based on variances, a covariance, and cardinalities corresponding to a first vector of counts from a first database and a second vector of counts from a second database, determining, by executing an instruction with the processor, a real root of the polynomial, the real root corresponding to an estimate of an overlap between the first vector of counts and the second vector of counts, and estimating, by executing an instruction with the processor, the audience size based on the estimate of the overlap and the cardinalities of the first vector of counts and the second vector of counts.

Example 24 includes the method of example 23, wherein the first database is associated with a first database proprietor and the second database is associated with a second database proprietor, the first vector of counts to have a first number of elements, ones of the elements in the first vector of counts corresponding to total numbers of first subscribers of the first database proprietor allocated to the respective ones of the elements in the first vector of counts based on a hash function applied to information associated with first subscribers, the first subscribers having been exposed to the media.

Example 25 includes the method of example 24, wherein the second vector of counts is to have a second number of elements the same as the first number, ones of the elements in the second vector of counts corresponding to total numbers of second subscribers of the second database proprietor allocated to the respective ones of the elements in the second vector of counts based on the hash function applied to information associated with second subscribers, the second subscribers having been exposed to the media.

Example 26 includes the method of example 25, wherein the overlap between the first vector of counts and the second vector of counts corresponds to a number of the first subscribers that are the same as the second subscribers.

Example 27 includes the method of example 24, wherein allocations of the first subscribers to ones of the elements in the first vector of counts is based on an integer value derived from an output of the hash function applied to the information associated with respective ones of the first subscribers.

Example 28 includes the method of example 27, wherein possible values for the integer value range from one up to the first number of elements.

Example 29 includes the method of example 24, wherein the information is personally identifiable information.

Example 30 includes the method of example 24, wherein the first number of elements is selected to provide a relative error in the audience size estimate no greater than a particular relative error at a particular confidence level.

Example 31 includes the method of example 23, further including normalizing the coefficient values based on a first cardinality of the first vector of counts, the first cardinality being less than or equal to a second cardinality of the second vector of counts.

Example 32 includes the method of example 31, wherein the estimate of the overlap corresponds to the real root multiplied by the first cardinality.

Example 33 includes the method of example 23, wherein elements in the first vector of counts include respective noise terms added to underlying raw data represented by the first vector of counts, the method further including determining the real root based on a variance of the respective noise terms.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to estimate an audience size for media based on vector of counts sketch data, the apparatus comprising:
a communications interface to receive a first vector of counts via a first network communication from a first server of a first database proprietor, the first vector of counts representative of first subscribers of the first database proprietor;
a coefficient analyzer to determine coefficient values of a polynomial based on variances in values in the first vector of counts and a second vector of counts, a covariance of the first and second vectors of counts, and cardinalities of the first and second vectors of counts, the second vector of counts representative of second subscribers of a second database proprietor, a sum of the cardinalities of the first and second vectors of counts to inaccurately reflect the audience size due to an overlap in subscribers represented by the first and second vectors of counts, the first and second vectors of counts to maintain a privacy of the first and second subscribers such that the overlap between the first and second vectors of counts cannot be directly determined to enable determination of the audience size based on both the first and second subscribers;
an overlap analyzer to:
determine a real root of the polynomial, the real root corresponding to an estimate of the overlap; and
improve functionality of the apparatus by estimating the audience size based on the estimate of the overlap and the cardinalities of the first vector of counts and the second vector of counts, the estimating of the audience size to improve the functionality of the apparatus by resolving the inaccurately reflected audience size of the sum of the cardinalities of the first and second vectors of counts, use of both the variances and the covariance to determine the coefficient values to improve functionality of the apparatus by increasing efficiencies in both processing and memory usage for the apparatus to estimate the audience size relative to an estimate made without using the variances; and
a report generator to generate a report based on the audience size estimate, the communication interface to transmit, via a second network communication, the report based on the audience size estimate to a third-party entity.

2. The apparatus of claim 1, wherein the first vector of counts is to have a first number of elements, ones of the elements in the first vector of counts corresponding to total numbers of the first subscribers of the first database proprietor allocated to the respective ones of the elements in the first vector of counts based on a hash function applied to information associated with the first subscribers, the first subscribers having been exposed to the media.

3. The apparatus of claim 2, wherein the second vector of counts is to have a second number of elements the same as the first number, ones of the elements in the second vector of counts corresponding to total numbers of the second subscribers of the second database proprietor allocated to the respective ones of the elements in the second vector of counts based on the hash function applied to information associated with the second subscribers, the second subscribers having been exposed to the media.

4. The apparatus of claim 3, wherein the overlap between the first vector of counts and the second vector of counts corresponds to a number of the first subscribers that are the same as the second subscribers.

5. The apparatus of claim 2, wherein allocations of the first subscribers to ones of the elements in the first vector of counts is based on an integer value derived from an output of the hash function applied to the information associated with respective ones of the first subscribers.

6. The apparatus of claim 5, wherein possible values for the integer value range from one up to the first number of elements.

7. The apparatus of claim 2, wherein the information is personally identifiable information.

8. The apparatus of claim 2, wherein the first number of elements is selected to provide a relative error in the audience size estimate no greater than a particular relative error at a particular confidence level.

9. The apparatus of claim 1, wherein the coefficient analyzer is to normalize the coefficient values based on a first cardinality of the first vector of counts, the first cardinality being less than or equal to a second cardinality of the second vector of counts.

10. The apparatus of claim 9, wherein the estimate of the overlap corresponds to the real root multiplied by the first cardinality.

11. The apparatus of claim 1, wherein elements in the first vector of counts include respective noise terms added to underlying raw data represented by the first vector of counts, the overlap analyzer to determine the real root based on a variance of the respective noise terms.

12. A non-transitory computer readable medium comprising instructions that, when executed, cause a machine to at least:
receive a first vector of counts via a first network communication from a first server of a first database proprietor, the first vector of counts representative of first subscribers of the first database proprietor;
determine coefficient values of a polynomial based on variances in values in the first vector of counts and a second vector of counts, a covariance of the first and second vectors of counts, and cardinalities of the first and second vectors of counts, the second vector of counts representative of second subscribers of a second database proprietor, a sum of the cardinalities of the first and second vectors of counts to inaccurately reflect an audience size due to an overlap in subscribers represented by the first and second vectors of counts, the first and second vectors of counts to maintain a privacy of the first and second subscribers such that the overlap between the first and second vectors of counts cannot be directly determined to enable determination of the audience size based on both the first and second subscribers;
determine a real root of the polynomial, the real root corresponding to an estimate of the overlap; and
estimate the audience size for media based on the estimate of the overlap and the cardinalities of the first vector of counts and the second vector of counts, the estimate of the audience size to improve functionality of the machine by resolving the inaccurately reflected audience size of the sum of the cardinalities of the first and second vectors of counts, use of both the variances and the covariance to determine the coefficient values to improve functionality of the machine by increasing efficiencies in both processing and memory usage for the machine to estimate the audience size relative to an estimate made without using the variances;
generate a report based on the audience size estimate; and
transmit, via a second network communication, the report based on the audience size estimate to a third-party entity.

13. The non-transitory computer readable medium of claim 12, wherein the first vector of counts is to have a first number of elements, ones of the elements in the first vector of counts corresponding to total numbers of the first subscribers of the first database proprietor allocated to the respective ones of the elements in the first vector of counts based on a hash function applied to information associated with the first subscribers, the first subscribers having been exposed to the media.

14. The non-transitory computer readable medium of claim 13, wherein the second vector of counts is to have a second number of elements the same as the first number, ones of the elements in the second vector of counts corresponding to total numbers of the second subscribers of the second database proprietor allocated to the respective ones of the elements in the second vector of counts based on the hash function applied to information associated with the second subscribers, the second subscribers having been exposed to the media.

15. The non-transitory computer readable medium of claim 14, wherein the overlap between the first vector of counts and the second vector of counts corresponds to a number of the first subscribers that are the same as the second subscribers.

16. The non-transitory computer readable medium of claim 13, wherein allocations of the first subscribers to ones of the elements in the first vector of counts is based on an integer value derived from an output of the hash function applied to the information associated with respective ones of the first subscribers.

17. The non-transitory computer readable medium of claim 16, wherein possible values for the integer value range from one up to the first number of elements.

18. The non-transitory computer readable medium of claim 13, wherein the first number of elements is selected to provide a relative error in the audience size estimate no greater than a particular relative error at a particular confidence level.

19. The non-transitory computer readable medium of claim 13, wherein the information is personally identifiable information.

20. The non-transitory computer readable medium of claim 12, wherein the instructions when executed cause the machine to normalize the coefficient values based on a first cardinality of the first vector of counts, the first cardinality being less than or equal to a second cardinality of the second vector of counts.

21. The non-transitory computer readable medium of claim 20, wherein the estimate of the overlap corresponds to the real root multiplied by the first cardinality.

22. The non-transitory computer readable medium of claim 12, wherein elements in the first vector of counts include respective noise terms added to underlying raw data represented by the first vector of counts, the instructions further causing the machine to determine the real root based on a variance of the respective noise terms.

23. A method to estimate an audience size for media based on vector of counts sketch data, the method comprising:
receiving a first vector of counts via a first network communication from a first server of a first database proprietor, the first vector of counts representative of first subscribers of the first database proprietor;
determining, by executing an instruction with a processor, coefficient values of a polynomial based on variances in values in the first vector of counts and a second vector of counts, a covariance of the first and second vectors of counts, and cardinalities of the first and second vectors of counts, the second vector of counts representative of second subscribers of a second database proprietor, a sum of the cardinalities of the first and second vectors of counts to inaccurately reflect the audience size due to an overlap in subscribers represented by the first and second vectors of counts, the first and second vectors of counts to maintain a privacy of the first and second subscribers such that the overlap between the first and second vectors of counts cannot be directly determined to enable determination of the audience size based on both the first and second subscribers;
determining, by executing an instruction with the processor, a real root of the polynomial, the real root corresponding to an estimate of the overlap; and improving functionality of the processor by estimating, by executing an instruction with the processor, the audience size based on the estimate of the overlap and the cardinalities of the first vector of counts and the second vector of counts, the estimating of the audience size to improve the functionality of the processor by resolving the inaccurately reflected audience size of the sum of the cardinalities of the first and second vectors of counts, use of both the variances and the covariance to determine the coefficient values to improve functionality of the processor by increasing efficiencies in both processing and memory usage for the processor to estimate the audience size relative to an estimate made without using the variances;

generating a report based on the audience size estimate; and transmitting, via a second network communication, the report based on the audience size estimate to a third-party entity.

24. The method of claim 23, wherein the first vector of counts is to have a first number of elements, ones of the elements in the first vector of counts corresponding to total numbers of the first subscribers of the first database proprietor allocated to the respective ones of the elements in the first vector of counts based on a hash function applied to information associated with the first subscribers, the first subscribers having been exposed to the media.

25. The method of claim 24, wherein the second vector of counts is to have a second number of elements the same as the first number, ones of the elements in the second vector of counts corresponding to total numbers of the second subscribers of the second database proprietor allocated to the respective ones of the elements in the second vector of counts based on the hash function applied to information associated with the second subscribers, the second subscribers having been exposed to the media.

26. The method of claim 25, wherein the overlap between the first vector of counts and the second vector of counts corresponds to a number of the first subscribers that are the same as the second subscribers.

27. The method of claim 24, wherein allocations of the first subscribers to ones of the elements in the first vector of counts is based on an integer value derived from an output of the hash function applied to the information associated with respective ones of the first subscribers.

28. The method of claim 27, wherein possible values for the integer value range from one up to the first number of elements.

29. The method of claim 24, wherein the information is personally identifiable information.

30. The method of claim 24, wherein the first number of elements is selected to provide a relative error in the audience size estimate no greater than a particular relative error at a particular confidence level.

31. The method of claim 23, further including normalizing the coefficient values based on a first cardinality of the first vector of counts, the first cardinality being less than or equal to a second cardinality of the second vector of counts.

32. The method of claim 31, wherein the estimate of the overlap corresponds to the real root multiplied by the first cardinality.

33. The method of claim 23, wherein elements in the first vector of counts include respective noise terms added to underlying raw data represented by the first vector of counts, the method further including determining the real root based on a variance of the respective noise terms.

* * * * *